US 9,110,314 B2

(12) United States Patent
Tu et al.

(10) Patent No.: US 9,110,314 B2
(45) Date of Patent: Aug. 18, 2015

(54) OPTICAL MODULATOR AND A METHOD OF FORMING THE SAME

(75) Inventors: Xiaoguang Tu, Singapore (SG); Tsung-Yang Jason Liow, Singapore (SG); Guo Qiang Patrick Lo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/339,238

(22) Filed: Dec. 28, 2011

(65) Prior Publication Data

US 2012/0189239 A1   Jul. 26, 2012

(30) Foreign Application Priority Data

Dec. 29, 2010  (SG) .................................. 201009756

(51) Int. Cl.
  *G02F 1/035*  (2006.01)
  *G02F 1/025*  (2006.01)
(52) U.S. Cl.
  CPC ...................................... *G02F 1/025* (2013.01)
(58) Field of Classification Search
  CPC ....... G02F 1/225; G02F 1/2255; G02F 1/025; G02F 1/035; G02F 1/011
  USPC .................................................. 385/1–3, 4, 8
  See application file for complete search history.

(56) References Cited

U.S. PATENT DOCUMENTS

| 6,298,177 | B1 * | 10/2001 | House ................................ 385/3 |
| 7,251,408 | B1 |  7/2007 | Gunn, III et al. |
| 2008/0212913 | A1 * |  9/2008 | Gill et al. ........................... 385/2 |
| 2011/0180795 | A1 * |  7/2011 | Lo et al. ........................... 257/51 |

OTHER PUBLICATIONS

Juthika Basak,et al., Developments in gigascale silicon optical modulators using free carrier dispersion mechanisms, Adv. Opt. Technol., vol. 2008, 678948-1-678948-10(2008).
Tsung-Yang Liow, et al, Silicon modulators and germanium photodetectors on SOI: Monolithic integration, compatibility, and performance optimization, IEEE J. Sel. Top. Quantum. Electronics, 16, 307-315(2010).
Ning-Ning Feng, et al. High speed carrier-depletion modulators with 1.4v.cm $V\pi L$ integrated on 0.25µm silicon-o-insulator waveguides, Opt. Express.,18, 7994-7999(2010).
Delphine Marris Morini,et al. Low loss and high speed silicon optical modulator based on a lateral carrier depletion structure, Opt. Express., 16, 334-339(2008).
Gilles Rasigade,et al. Performance evolutions of carrier depletion silicon optical modulators: From p-n to p-i-p-i-n doides, IEEE J. Quantum Electronics, 16, 179-184(2010).
U. Littmark,et al.Ranges of energetic ions in matter, Phys. Rev. A., 23, 64-72(1981).

(Continued)

*Primary Examiner* — Jennifer Doan
(74) *Attorney, Agent, or Firm* — K. David Crockett, Esq.; Niky Economy Syrengelas, Esq.; Crockett & Crockett, PC

(57) ABSTRACT

According to embodiments of the present invention, an optical modulator is provided. The optical modulator includes a depletion region comprising a junction between from a first conductivity type portion and a second conductivity type portion, a first intrinsic region, and a second intrinsic region, and wherein the depletion region is disposed between the first intrinsic region and the second intrinsic region.

12 Claims, 17 Drawing Sheets

(56) References Cited

OTHER PUBLICATIONS

Xiaoguang Tu, et al. A high performance Si based MOS electrooptic phase modulator with a shunt capacitor configuration, IEEE J. Lightwave. Technology, 24, 1000-1007(2006).
Richard A. Soref, et al. Electrooptical effects in silicon, IEEE J. Quantum Electronics, QE-23, 123-129(1987).
L. C. Kimerling, et al. Electronic-photonic integrated circuits on the CMOS platform, Proc. of SPIE. 6125, 612502-1 (2006).
Mario Paniccia, Integrating silicon photonics, Nature. Photonics 4, 498-499(2010).
G. T. Reed, et al. Silicon optical modulators, Nature. Photonics 4, 518-526(2010).
Jurgen Michel, High performance Ge-on-Si photodetectors, Nature Photonics 4, 527-534(2010).
Stephen R. Giguere, Simulation studies of silicon electro-optic waveguide decices, J. Appl. Phys, 68, 4964-4970(1990).
S. H. Tao, et al., Ultra-high order ring resonator system with sharp transmission peaks, Opt. Express. 18, 393-399 (2010).
A. Yariv, Universal relations for coupling of optical power between microresonators and dielectric waveguides, Electronics Letters, 36, 321-322(2000).
Liu, et al., a high-speed silicon optical modulator based on a metal-oxide-semiconductor capacitor, Nature 427, 615-618, 2004 (Intel).
Gardes et al., High-speed modulation of a compact silicon ring resonator based on a reverse-biased pn diode, Opt. Express, 17, 21986-21991 (2009).

* cited by examiner

OPTICAL MODULATOR AND A METHOD OF FORMING THE SAME

CROSS-REFERENCE TO RELATED APPLICATION

This application claims the benefit of priority of Singapore patent application No. 201009756-6, filed 29 Dec. 2010, the content of it being hereby incorporated by reference in its entirety for all purposes.

TECHNICAL FIELD

Various embodiments relate to an optical modulator and a method of forming the optical modulator. Further embodiments relate to a waveguide including the optical modulator, a device including the optical modulator and a device including a waveguide including the optical modulator.

BACKGROUND

Active silicon photonic devices play critical roles in future silicon photonic integrated circuits including light emitting devices, optical modulators and detectors. Generally speaking, in order to integrate active functions into a passive device system, it is necessary to dope the silicon waveguide with either donor or acceptor ions. In this process, the introduced free carriers induce unavoidable absorption loss under optical communication wavelength following the free carrier's effect which degrades the performance of photonic devices. In traditional p-i-n silicon modulator with larger rib waveguide dimensions, this problem is not that distinct especially after enlarging the distance between doping regions and optical waveguide. However, when the modulator's dimension becomes smaller (450×250 $nm^2$), diffusion of free carriers into non-intentional doped region has to be considered.

How to reduce the absorption loss coming from the diffused carriers has been one of the most urgent problems. For example, the recently reported silicon optical modulator with the highest switching speed is realized with a reversed bias PN junction lying near the centre of the waveguide [J. Basak, et al., *Adv. Opt. Technol.*, vol. 2008, 678948-1-678948-10 (2008)]. With a useful extinction ratio (~6.1 dB), the switching speed reached 10 Gb/s with 2 mm-long phase shifter and the corresponding loss caused by two arms is 1 dB/mm [T. Y. Liow, et al., *IEEE J. Sel. Top. Quantum. Electronics*, 16, 307-315 (2010)]. Another reported 1 mm-long modulator can operate at 12 GHz modulation speed with a 6 dB extinction ratio under −8 V bias with 2.5 dB insertion loss [N. N. Feng, et al., *Opt. Express*, 18, 7994-7999 (2010)]. The high additional loss mainly comes from the free carriers' absorption in the doped regions [N. N. Feng, et al., *Opt. Express*, 18, 7994-7999 (2010)].

A p-i-p-i-n diode has also been presented to achieve low loss optical modulator with the same cutoff frequency as that of a pn diode [D. M. Morini, et al., *Opt. Express*, 16, 334-339 (2008); G. Rasigade, et al., *IEEE J. Quantum Electronics*, 16, 179-184 (2010)]. However, both of the intrinsic regions are affected by the lateral diffused electrons and holes from neighboring p-doped and n-doped regions. For boron ions implanted with 80 keV ion energy, the lateral diffused length reaches 75 nm [U. Littmark, and J. F. Ziegler, *Phys. Rev. A.*, 23, 64-72 (1981)] which made the neighbor intrinsic region actually a p-type semiconductor.

The performance of a silicon optical modulator depends on three main parameters, such as the modulation efficiency, the switching speed and the total loss. Presently, the loss of a conventional silicon optical modulator is too high for commercial use. In the market for optical communication, the insertion loss of 10 Gbps Lithium Niobate modulator is nearly 4-5 dB. If the absorption loss of the silicon modulator can be reduced, the performance of the silicon modulator may be comparable to that of the Lithium Niobate modulator. However, current approaches for the reduction of the total loss always comes with the degradation of other characteristics, including the modulation efficiency and/or the switching speed.

SUMMARY

According to an embodiment, an optical modulator is provided. The optical modulator may include a depletion region including a junction between from a first conductivity type portion and a second conductivity type portion, a first intrinsic region, and a second intrinsic region, and wherein the depletion region is disposed between the first intrinsic region and the second intrinsic region.

According to an embodiment, an optical modulator is provided. The optical modulator may include a depletion region including a junction between from a first conductivity type portion and a second conductivity type portion, and an intrinsic region configured to substantially surround the depletion region.

According to an embodiment, a waveguide is provided. The waveguide may include an optical modulator as described herein.

According to an embodiment, a device is provided. The device may include an optical modulator as described herein or a waveguide as described herein.

According to an embodiment, a method of forming an optical modulator is provided. The method may include providing a depletion region including a junction between from a first conductivity type portion and a second conductivity type portion, providing a first intrinsic region, and providing a second intrinsic region, and wherein the depletion region is disposed between the first intrinsic region and the second intrinsic region.

According to an embodiment, a method of forming an optical modulator is provided. The method may include providing a depletion region including a junction between from a first conductivity type portion and a second conductivity type portion, and providing an intrinsic region configured to substantially surround the depletion region.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 10A shows a plot of simulated doping level profiles for R1 and R2, while

DETAILED DESCRIPTION

Figure 1A:
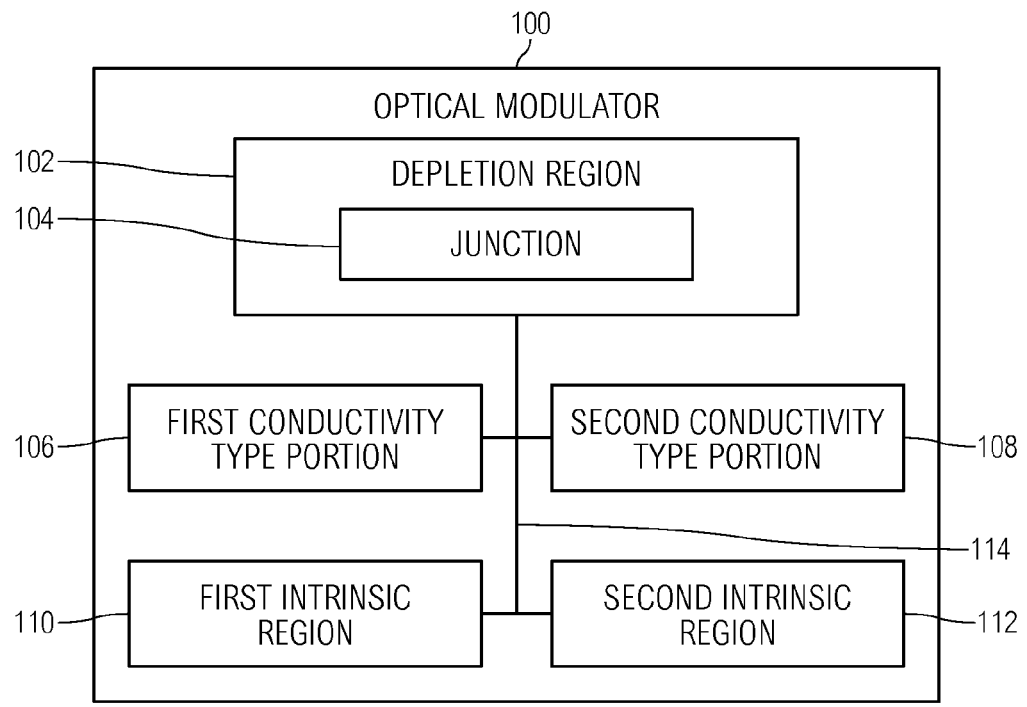
FIGS. 1A to 1C show schematic block diagrams of an optical modulator, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other method or device. Similarly, embodiments described in the context of a method are analogously valid for a device, and vice versa.

In the context of various embodiments, the phrase "at least substantially" may include "exactly" and a variance of +/−5% thereof. As an example and not limitations, "A is at least substantially same as B" may encompass embodiments where A is exactly the same as B, or where A may be within a variance of +/−5%, for example of a value, of B, or vice versa.

In the context of various embodiments, the term "about" or "approximately" as applied to a numeric value encompasses the exact value and a variance of +/−5% of the value.

Various embodiments may relate to the fields of silicon waveguide photonics and high speed silicon optical modulator.

Various embodiments may provide a low loss or low absorption loss modulator (e.g. optical modulator, e.g. silicon optical modulator). Various embodiments may provide a silicon optical modulator where the absorption loss of the silicon modulator may be reduced, with minimal or no degradation of the modulation efficiency and the switching speed of the modulator. In other words, optical loss may be reduced while maintaining the speed and efficiency (i.e. the optical modulator may have compatible modulation efficiency and switching speed, with a lower loss). In addition, various embodiments may provide simple, cost-effective, easy to fabricate and low loss optical modulators.

In various embodiments, the loss of the silicon optical modulator may be reduced by employing pn junction doping designs. This may be achieved, for example, by employing a method of fabrication based on compensated doping. The pn junction may be partially doped.

In various embodiments, the depletion region of the pn junction may be configured to form an active area or region of the optical modulator of various embodiments for propagation of an optical mode. This is because a majority of the optical mode may be confined within the depletion region.

In various embodiments, under an applied reversed bias voltage across the pn junction, the free carriers at the centre of the optical mode may be depleted, inducing changes in the refractive index and the optical phase. The change in the phase (i.e. phase shift) induces a change in the output optical intensity, for example after passing through a Mach-Zehnder Interferometer (MZI) or a micro-ring resonator (MRR) including the silicon optical modulator of various embodiments, thereby realizing optical modulation.

In various embodiments, free carrier absorption plays a main role in the total loss of the modulator. Therefore, reducing the doping level or concentration of the adjacent areas on the two opposed sides of the depletion region may reduce the loss of the optical modulator.

In various embodiments, the area or region adjacent and outside of the depletion region may induce absorption loss, for example due to free carrier absorption. Therefore, the absorption loss of the optical modulator may be reduced by reducing the doping level or concentration of the area or region outside of the depletion region, which does not affect the performance of the modulator in terms of the modulation efficiency and the switching speed. Various embodiments may employ a fabrication process using doping compensation, as an example of one of the methods that may be used to reduce the doping level.

The silicon optical modulators of various embodiments may be employed as high performance silicon optical modulators. The silicon optical modulators of various embodiments may also be applied to silicon photonics integrated circuits, for example, integrating the silicon optical modulator with silicon optical detector and other passive devices in order to form or produce silicon photonics integrated circuits.

In various embodiments, the silicon optical modulators of various embodiments may include a pn junction having dopant concentrations of about $5.0 \times 10^{18}$ $cm^3$ for both the p-type portion and the n-type portion of the pn junction. The silicon optical modulators of various embodiments may be optimized, for examples in terms of structure and/or dopant concentrations, and may exhibit a modulation efficiency of about 1.8 Vcm and a switching speed of about 35 GHz and possibly up to 40 GHz. The silicon optical modulators of various embodiments may exhibit an absorption loss of about 0.31 dB/mm as a phase shifter.

Various embodiments may also provide methods of fabrication that employ standard complementary metal oxide semiconductor (CMOS) processes (i.e. CMOS compatible) with simple process integration schemes.

FIG. 1A shows a schematic block diagram of an optical modulator 100, according to various embodiments. The optical modulator 100 includes a depletion region 102 including a junction 104 between from a first conductivity type portion 106 and a second conductivity type portion 108, a first intrinsic region 110, and a second intrinsic region 112, and wherein the depletion region 102 is disposed between the first intrinsic region 110 and the second intrinsic region 112. The line represented as 114 is illustrated to show the relationship between the different components, which may include electrical coupling and/or mechanical coupling.

The first conductivity type may be a p-type conductivity type, and the second conductivity type may be an n-type conductivity type.

The first intrinsic region 110 may be configured to at least partially contact the first conductivity type portion 106 of the junction 104 and the second intrinsic region 112 may be configured to at least partially contact the second conductivity type portion 108 of the junction 104.

The first intrinsic region 110 may include a region doped with dopants of the first conductivity type at a concentration lower than a concentration of dopants provided in the first conductivity type portion 106 of the junction 104.

The second intrinsic region 112 may include a region doped with dopants of the second conductivity type at a concentration lower than a concentration of dopants provided in the second conductivity type portion 108 of the junction 104.

Figure 1B:
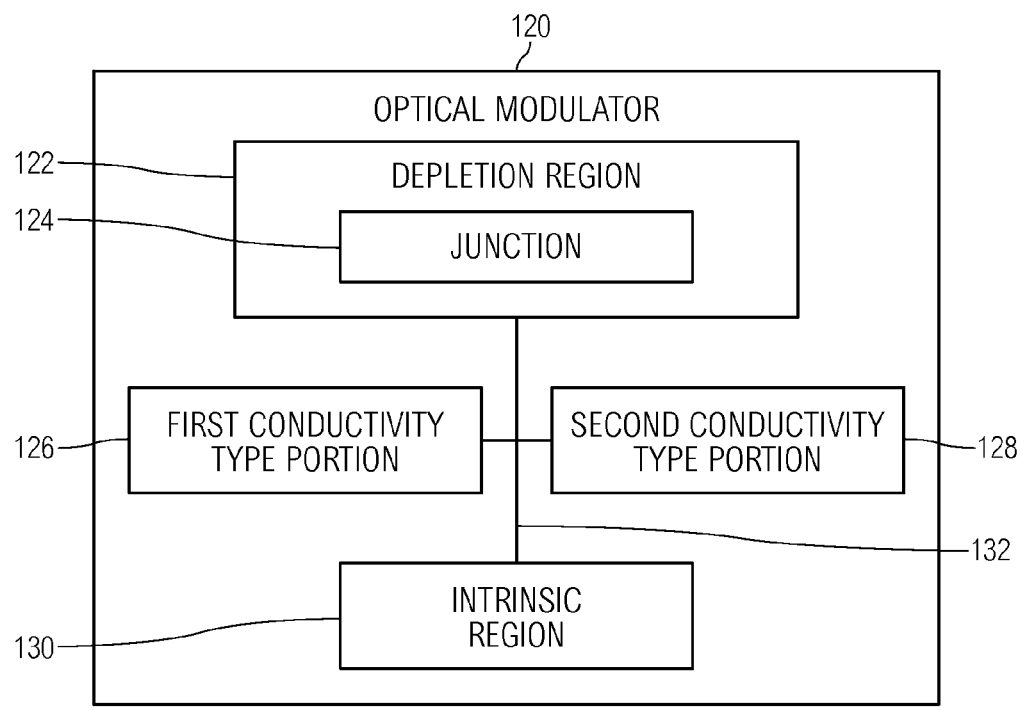

FIG. 1B shows a schematic block diagram of an optical modulator 120, according to various embodiments. The optical modulator 120 includes a depletion region 122 including a junction 124 between from a first conductivity type portion 126 and a second conductivity type portion 128, and an intrinsic region 130 configured to substantially or partially surround the depletion region 122. The line represented as 132 is illustrated to show the relationship between the different components, which may include electrical coupling and/or mechanical coupling.

The first conductivity type may be a p-type conductivity type, and the second conductivity type may be an n-type conductivity type.

In the context of various embodiments, the first conductivity type portion (e.g. 106, 126) and the second conductivity type portion (e.g. 108, 128) of the junction (e.g. 104, 124) may be configured to have equal widths or different widths, or the first conductivity type portion (e.g. 106, 126) may be configured to have a smaller width than a width of the second conductivity type portion (e.g. 108, 128).

Figure 1C:
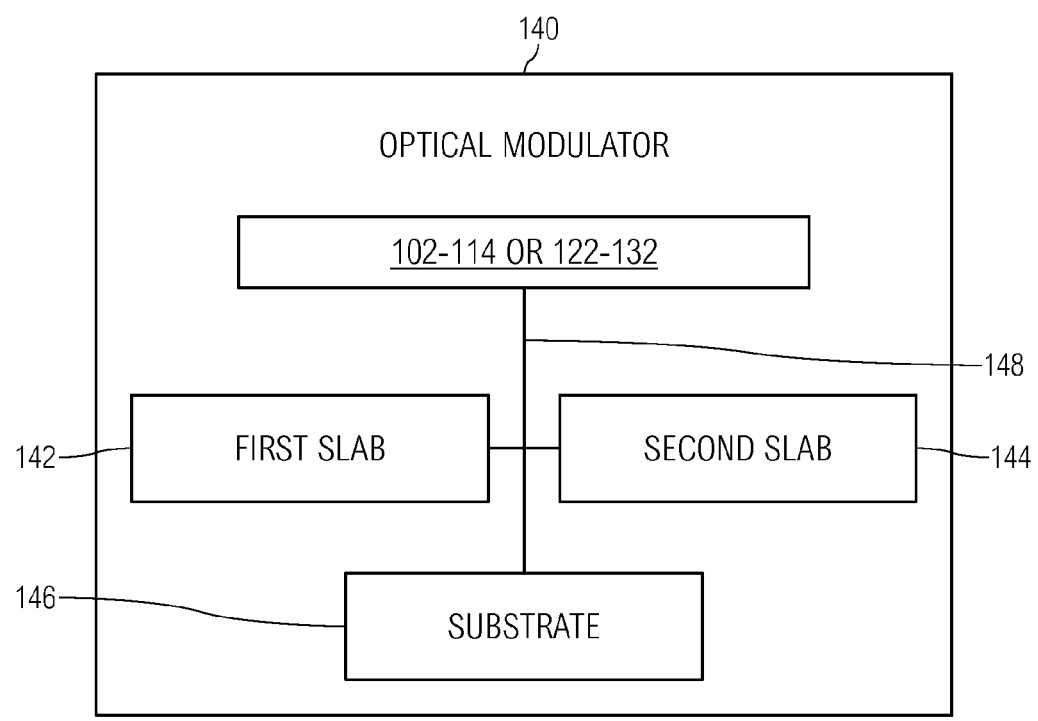

FIG. 1C shows a schematic block diagram of an optical modulator 140, according to various embodiments. The optical modulator 140 may include a depletion region 102, a junction 104, a first conductivity type portion 106, a second conductivity type portion 108, a first intrinsic region 110, and a second intrinsic region 112, which may be similar to the embodiment as described in the context of FIG. 1A, or may include a depletion region 122, a junction 124, a first conductivity type portion 126, a second conductivity type portion 128, and an intrinsic region 130, which may be similar to the embodiment as described in the context of FIG. 1B.

The optical modulator 140 may further include a first slab 142 doped with dopants of the first conductivity type, wherein the first slab 142 may be coupled to the first conductivity type portion (106, 126) of the junction (104, 124), and a second slab 144 doped with dopants of the second conductivity type, wherein the second slab 144 may be coupled to the second conductivity type portion (108, 128) of the junction (104, 124).

The first slab 142 may include dopants at a concentration substantially equal or higher than a concentration of dopants in the first conductivity type portion (106, 126) of the junction (104, 124). The second slab 144 may include dopants at a concentration substantially equal or higher than a concentration of dopants in the second conductivity type portion (108, 128) of the junction (104, 124).

The optical modulator 140 may further include a substrate 146, wherein the depletion region (102, 122) may be disposed on the substrate 146. The junction (104, 124) of the depletion region (102, 122) may be arranged at least substantially perpendicular or parallel to the substrate 146.

In the context of various embodiments, the first conductivity type portion (e.g. 106, 126) of the junction (e.g. 104, 124) may include dopants selected from the group consisting of boron (B), aluminium (Al), gallium (Ga) and indium (In) (i.e. acceptor dopants).

In the context of various embodiments, the second conductivity type portion (e.g. 108, 128) of the junction (e.g. 104, 124) may include dopants selected from the group consisting of phosphorus (P), arsenic (As) and antimony (Sb) (i.e. donor dopants).

In the context of various embodiments, the depletion region (e.g. 102, 122) may include silicon (Si). In the context of various embodiments, the first instrinsic region 110, the second intrinsic region 112 and the intrinsic region 130 may include silicon (Si).

In the context of various embodiments, the depletion region (e.g. 102, 122) may be configured to form an active region of the modulator (e.g. 100, 120, 140) for propagation of an optical mode. The optical modulator (e.g. 100, 120, 140) may be configured to change a phase of the optical mode.

In the context of various embodiments, a junction may be formed at the boundary between a first conductivity type portion and a second conductivity type portion. For example, a pn junction may be formed at the boundary between a p-type portion and an n-type portion.

In the context of various embodiments, the term "depletion region" means an insulating region within a conductive, doped semiconductor material where the mobile charge carriers (electrons and/or holes) have diffused away, or have been forced away by an electric field. The only elements remaining in the depletion region are ionized donor or acceptor impurities. A depletion region is formed across a pn junction.

In the context of various embodiments, the term "p-type" may mean a semiconductor with an excess of mobile holes. Accordingly, the term "p-type portion" means a portion having a host material (generally a semiconductor) that is doped with dopant atoms that may accept weakly-bound outer electrons from the host material, thereby creating vacancies left behind by the electrons, known as holes. This results in an electrically conductive p-type semiconductor with an excess number of mobile holes (positively charged carriers). Such dopants are also generally referred to as acceptors.

In the context of various embodiments, the term "n-type" may mean a semiconductor with an excess number of mobile electrons. Accordingly, the term "n-type portion" means a portion having a host material (generally a semiconductor) that is doped with dopant atoms that may provide extra conduction electrons to the host material, thereby resulting in an electrically conductive n-type semiconductor with an excess number of mobile electrons (negatively charged carriers). Such dopants are also generally referred to as donors.

In the context of various embodiments, the terms "p+-doped region" and "p++-doped region" mean regions that are doped with a relatively high amount of acceptor dopants, where the excess mobile hole concentrations are very large.

In the context of various embodiments, the terms "n+-doped region" and "n++-doped region" mean regions that are doped with a relatively high amount of donor dopants, where the excess mobile electron concentrations are very large.

In the context of various embodiments, the term "intrinsic" may mean undoped, such that the term "intrinsic region" may mean a region of undoped semiconductor or host material, without the presence of any significant dopant elements or atoms.

In the context of various embodiments, the term "intrinsic region" as used herein may also include a region which contains dopants or ions at a concentration or level that is lower than the dopant concentration of the p-type portion and/or the n-type portion. In various embodiments, the intrinsic region may have a dopant level of less than about $1.0 \times 10^{17}$ $cm^{-3}$.

In the context of various embodiments, the host material may be silicon (Si), which is a Group IV element. In various embodiments, the host material may be polycrystalline silicon. The p-type portion may be implanted with Group III dopants or elements, for example boron (B), to form a p-type semiconductor portion. The n-type portion may be implanted with Group V dopants or elements, for example phosphorus (P), to form an n-type semiconductor portion.

Various embodiments may further provide a waveguide including an optical modulator (e.g. 100, 120, 140). The waveguide may include or may be a substantially straight waveguide or a substantially bend waveguide.

Various embodiments may further provide a device including an optical modulator (e.g. 100, 120, 140) or a waveguide as described above. The device may include or may be an interferometer (e.g. Mach-Zehnder Interferometer) or an optical resonator (e.g. ring resonator) or a Fabry Perot cavity.

Figure 2A:
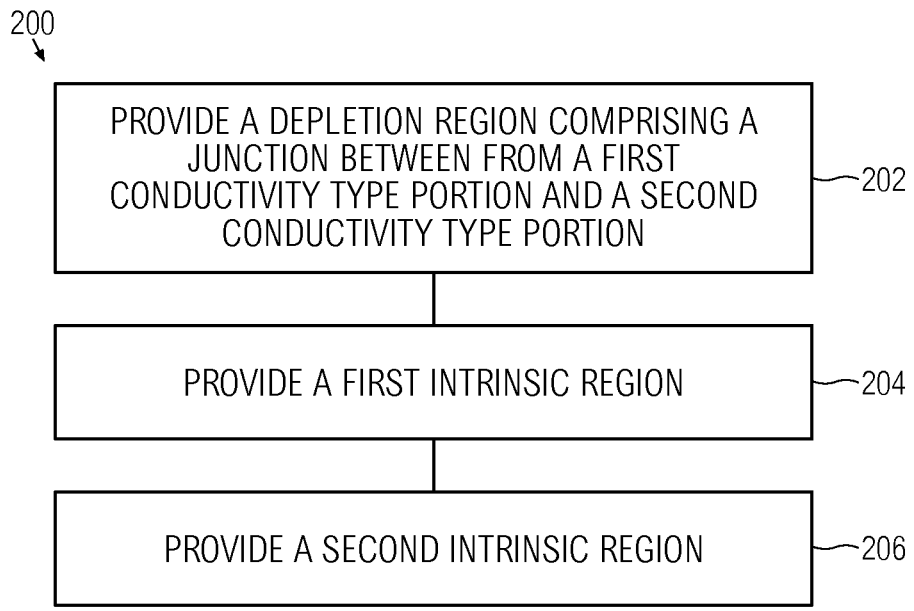
FIGS. 2A and 2B show flow charts illustrating a method of forming an optical modulator, according to various embodiments.

FIG. 2A shows a flow chart 200 illustrating a method of forming an optical modulator, according to various embodiments.

At 202, a depletion region including a junction between from a first conductivity type portion and a second conductivity type portion is provided or formed.

At 204, a first intrinsic region is provided or formed. This may include providing dopants of the second conductivity type having a first concentration in the first intrinsic region, and providing dopants of the first conductivity type having a second concentration higher than the first concentration, in the first intrinsic region, wherein the dopants of the first conductivity type and the dopants of the second conductivity type are dopants having opposite signs.

At 206, a second intrinsic region is provided or formed. This may include providing dopants of the first conductivity type having the first concentration in the second intrinsic region, and providing dopants of the second conductivity type having the second concentration higher than the first concentration, in the second intrinsic region, wherein the dopants of the first conductivity type and the dopants of the second conductivity type are dopants having opposite signs.

In various embodiments of the method, the depletion region is disposed between the first intrinsic region and the second intrinsic region.

Figure 2B:
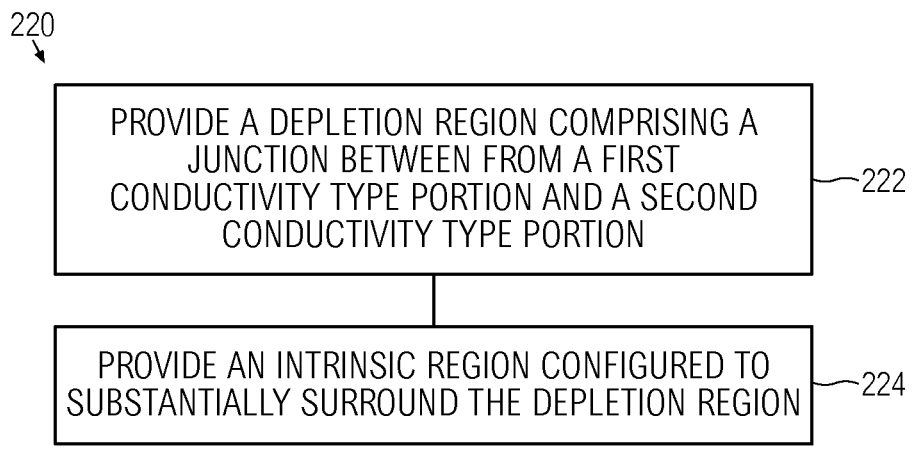

FIG. 2B shows a flow chart 220 illustrating a method of forming an optical modulator, according to various embodiments.

At 222, a depletion region including a junction between from a first conductivity type portion and a second conductivity type portion is provided or formed.

At 224, an intrinsic region configured to substantially or partially surround the depletion region is provided or formed.

Figure 3A:
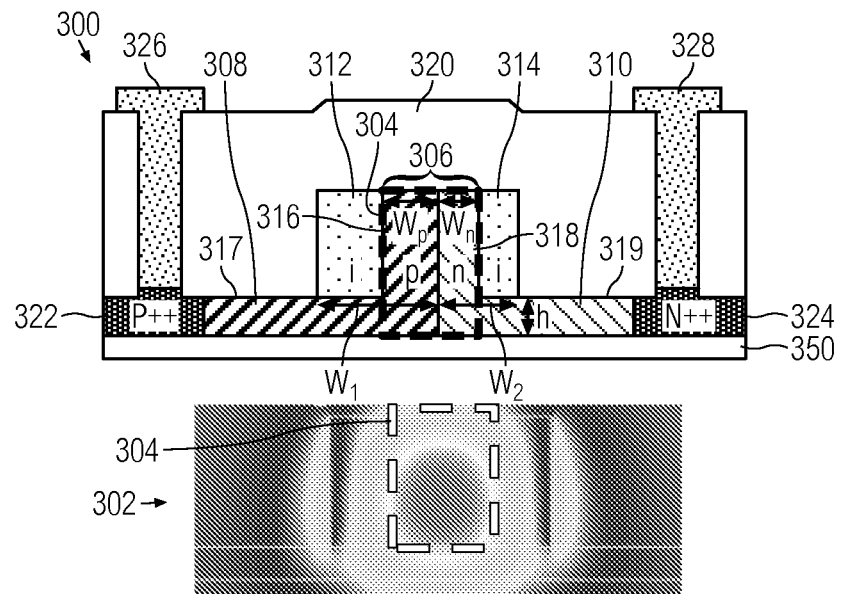
FIG. 3A shows a schematic cross-sectional view of an optical modulator and its corresponding optical mode distribution, according to an embodiment.

FIG. 3A shows a schematic cross-sectional view of an optical modulator (e.g. silicon optical modulator) 300 and its corresponding optical mode distribution 302, according to an embodiment. The cross-sectional view of the optical modulator 300 illustrates the doping distribution of the optical modulator 300. The optical modulator 300 includes a depletion region (as represented by the dashed box) 304 including a junction (e.g. pn junction) 306 between from a p-type portion 308 (e.g. doped with boron, aluminium, gallium or indium) and an n-type portion 310 (e.g. doped with phosphorus, arsenic and antimony), a first intrinsic region 312, and a second intrinsic region 314. As shown in FIG. 3A, the depletion region 304 is disposed between the first intrinsic region 312 and the second intrinsic region 314. In other words, the depletion region 304 is sandwiched between the first intrinsic region 312 and the second intrinsic region 314, where the first intrinsic region 312 and the second intrinsic region 314 are arranged adjacent to the two opposed vertical sidewalls 316, 318, of the depletion region 304 or the junction 306.

As shown in FIG. 3A, the first intrinsic region 312 at least partially contacts the p-type portion 308 of the junction 306, on the sidewall 316 and a part of the surface 317 of the p-type portion 308, while the second intrinsic region 314 at least partially contacts the n-type portion 310 of the junction 306, on the sidewall 318 and a part of the surface 319 of the n-type portion 310.

The first intrinsic region 312 may be doped with p-type or acceptor dopants (e.g. boron, aluminium, gallium or indium) at a concentration lower than a concentration of dopants (e.g. boron, aluminium, gallium or indium) of the p-type portion 308 of the junction 306. The second intrinsic region 314 may be doped with n-type or donor dopants (e.g. phosphorus, arsenic and antimony) at a concentration lower than a concentration of dopants (e.g. phosphorus, arsenic and antimony) provided in the n-type portion 310 of the junction 306.

In various embodiments, the p-type portion 308 and the n-type portion 310 of the junction 306 may have at least substantially equal widths or different widths (e.g. the p-type portion 308 may have a smaller width than the width of the n-type portion 310).

The p-type portion 308 may have a width, $W_p$, in a range of between about 50 nm and about 2 m (i.e. 2000 nm), e.g. between about 50 nm and about 1500 nm, between about 50 nm and about 500 nm, between about 50 nm and about 200 nm, between about 100 nm and about 1000 nm, between about 100 nm and about 500 nm or between about 100 nm and about 300 nm. The n-type portion 310 may have a width, $W_n$, in a range of between about 50 nm and about 2 μm (i.e. 2000 nm), e.g. between about 50 nm and about 1500 nm, between about 50 nm and about 500 nm, between about 50 nm and about 200 nm, between about 100 nm and about 1000 nm, between about 100 nm and about 500 nm or between about 100 nm and about 300 nm.

In various embodiments, the first intrinsic region 312 and the second intrinsic region 314 may have at least substantially equal widths or different widths (e.g. the first intrinsic region 312 may have a larger width than the width of the second intrinsic region 314).

The first intrinsic region 312 may have a width in a range of between about 30 nm and about 250 nm, e.g. between about 50 nm and about 250 nm, between about 50 nm and about 200 nm, between about 50 nm and about 100 nm, or between about 100 nm and about 150 nm.

The second intrinsic region 314 may have a width in a range of between about 30 nm and about 250 nm, e.g. between about 50 nm and about 250 nm, between about 50 nm and about 200 nm, between about 50 nm and about 100 nm, or between about 100 nm and about 150 nm.

The optical modulator 300 may further include a passivation layer 320, for example of silicon oxide (SiO$_2$) or silicon nitride (Si$_3$N$_4$), arranged or formed over the depletion region 304, the p-type portion 308, the n-type portion 310, the first intrinsic region 312 and the second intrinsic region 314.

The optical modulator 300 may further include a p++-doped region 322 adjacent to the p-type portion 308 and an n++-doped region 324 adjacent to the n-type portion 310. The p++-doped region 322 may be formed, for example, by doping an end of the p-type portion 308 with additional acceptor dopants. The n++-doped region 324 may be formed, for example, by doping an end of the n-type portion 310 with additional donor dopants.

The optical modulator 300 may further include an electrode (e.g. metal electrode) 326 mechanically and/or electrically coupled with the p++-doped region 322 and extending through the passivation layer 320, and another electrode (e.g. metal electrode) 328 mechanically and/or electrically coupled with the n++-doped region 324 and extending through the passivation layer 320.

The optical mode distribution 302 in FIG. 3A shows that a majority of the optical mode is confined within the depletion region 304. Therefore, the depletion region 304 may be configured to form an active area or region of the modulator 300 for propagation of an optical mode.

Figure 3B:
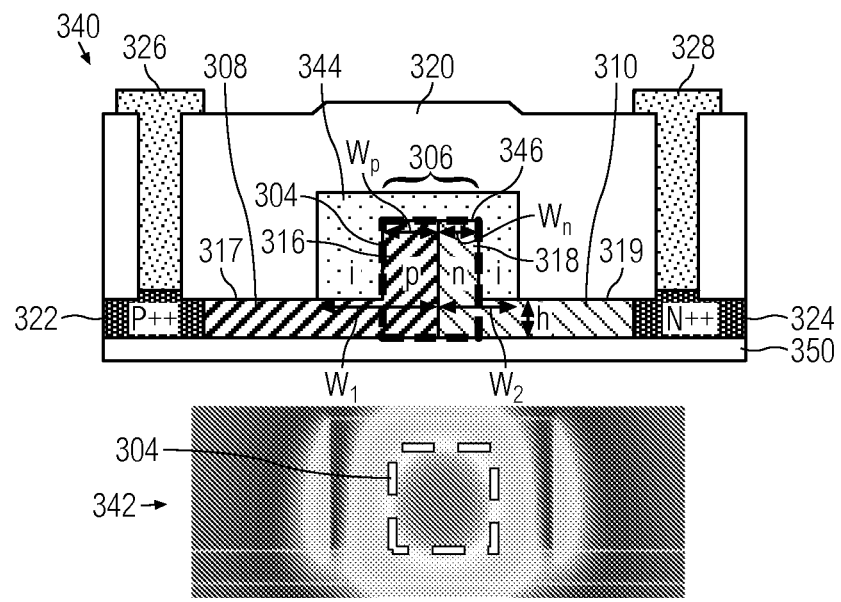
FIG. 3B shows a schematic cross-sectional view of an optical modulator and its corresponding optical mode distribution, according to another embodiment.

FIG. 3B shows a schematic cross-sectional view of an optical modulator 340 and its corresponding optical mode distribution 342, according to another embodiment. The optical modulator 340 is similar to the optical modulator 300 (FIG. 3A), except that the optical modulator 340 includes an intrinsic region 344 configured to substantially or partially surround the depletion region 304 or the junction 306. As shown in FIG. 3B, the intrinsic region 344 is formed or arranged to surround the depletion region 304 on the two opposed vertical sidewalls 316, 318, and the top surface 346 of the depletion region 304.

Features or components of the optical modulator 340 that are similarly present in the optical modulator 300 may be as described in the context of the optical modulator 300.

As shown in FIG. 3B, the intrinsic region 344 at least partially contacts the p-type portion 308 of the junction 306, on the sidewall 316, the top surface 346 and a part of the surface 317 of the p-type portion 308, and also at least partially contacts the n-type portion 310 of the junction 306, on the sidewall 318, the top surface 346 and a part of the surface 319 of the n-type portion 310.

In various embodiments, the intrinsic region 344 surrounding the depletion region 304 may have at least substantially equal widths or the intrinsic region 344 adjacent or contacting the sidewall 316 may have a larger width than the width of the intrinsic region 344 adjacent or contacting the sidewall 318.

The optical mode distribution 342 in FIG. 3B shows that a majority of the optical mode is confined within the depletion region 304. Therefore, the depletion region 304 may be configured to form an active area or region of the modulator 340 for propagation of an optical mode.

The optical modulators 300, 340 may include a substrate (e.g. silicon substrate) 350, where the depletion region 304 is disposed on the substrate 350. While FIGS. 3A and 3B show that the junction 306 is arranged at least substantially horizontal or parallel to the substrate 350, it should be appreciated that the junction 306 may be arranged at least substantially perpendicular or vertical to the substrate 350 for optical modulators in further embodiments. For example, where the junction 306 is a vertical junction to the substrate 350, the p-type portion 308 may be arranged on the substrate 350 and the n-type portion 310 may be arranged on the p-type portion 308.

In various embodiments, the optical modulators 300, 340 may be configured to change a phase of the optical mode. The overlap between the optical mode and the depletion region 304 may contribute to the phase shift of the modulators 300, 340, while the area outside of the depletion region 304 has no contribution to the phase shift but may induce absorption loss. Therefore, reducing the doping level or concentration of the area outside of the depletion region 304 may reduce the absorption loss of the optical modulators 300, 340.

The optical modulators 300, 340, may have the dimension h of about 50 nm, $W_1$ of about 250 nm and $W_2$ of about 200 nm. However, it should be appreciated that each of $W_1$ and $W_2$ may be a width in a range of between about 150 nm and about 300 nm, e.g. between about 200 nm and about 300 nm, e.g. about 200 nm, about 250 nm or about 300 nm.

The p-type portion 308 and the n-type portion 310 of the junction 306 may form a rib waveguide. The p-type portion 308, the n-type portion 310, the first intrinsic region 408 and the second intrinsic region 410 of the optical modulator 300, and the p-type portion 308, the n-type portion 310 and the intrinsic region 344 of the optical modulator 340, respectively form a rib structure with a width, $W_{rib}=W_1+W_2$.

Figure 3C:
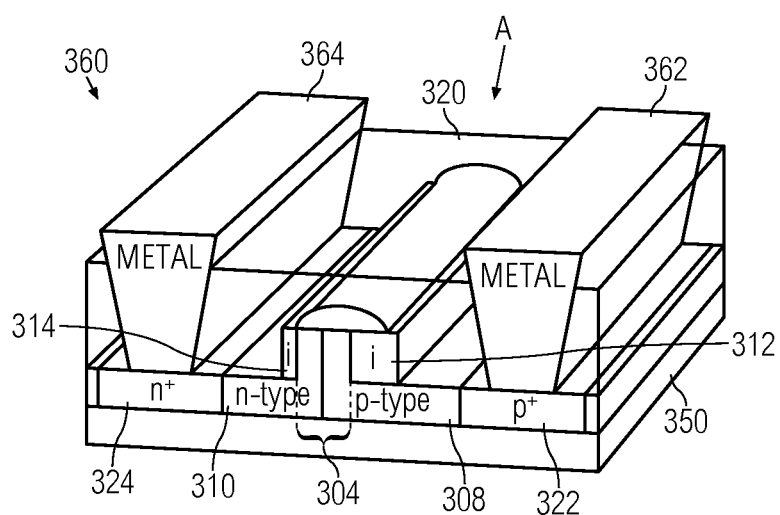
FIG. 3C shows a schematic perspective view of an optical modulator, according to various embodiments.

FIG. 3C shows a schematic perspective view of an optical modulator 360, according to various embodiments. The optical modulator 360 is similar to the configuration of the optical modulator 300 (FIG. 3A), when looking in the direction of A.

Features or components of the optical modulator 360 that are similarly present in the optical modulator 300 may be as described in the context of the optical modulator 300.

The metal electrodes 362, 364 of the optical modulator 360 have a tapered configuration from the top surface of the respective electrodes 362, 364 to the p+-doped region 322 and the n+-doped region 324 respectively.

The performance parameters of optical modulators include the switching speed, the modulation efficiency and the insertion loss, which is mainly due to absorption loss. The high loss of conventional pn junction modulator is mainly due to the free carriers' absorption in the doped regions. The approach of the various embodiments is to optimize (i.e. minimise) this portion of the absorption loss in the doped regions, without degrading the switching speed and modulation efficiency, through compensated doping of the active region with donor or acceptor ions/dopants. The active region or depletion region of the pn junction may confine optical modes and act as a waveguide to propagate the optical modes. In various embodiments, the doping profile of the pn junction cross section may be optimised so as to reduce the absorption loss of the waveguide, while maintaining a high doping level or concentration at the bottom of the waveguide in order to minimise or avoid degrading other characteristics of the modulator such as the switching speed.

Figure 4:
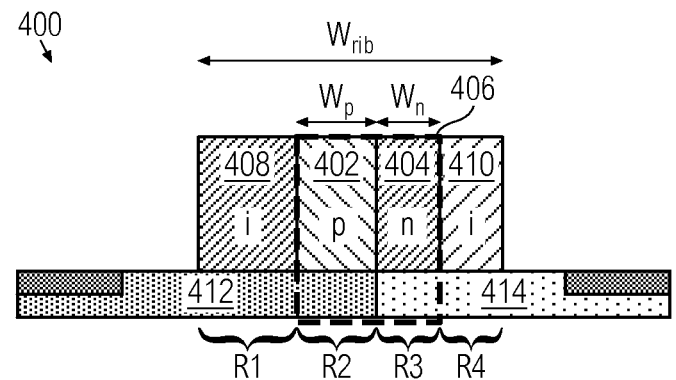
FIG. 4 shows schematic cross-sectional views of optimized structures of optical modulators of various embodiments and a pn junction of a conventional optical modulator.
Figure 4:
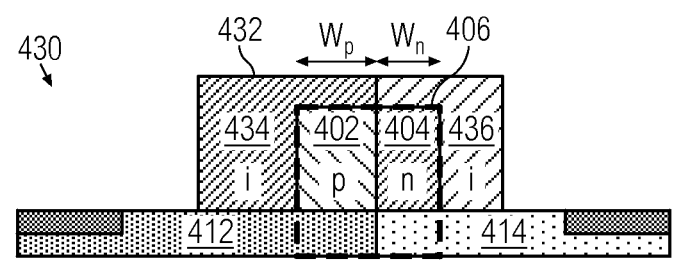
Figure 4:
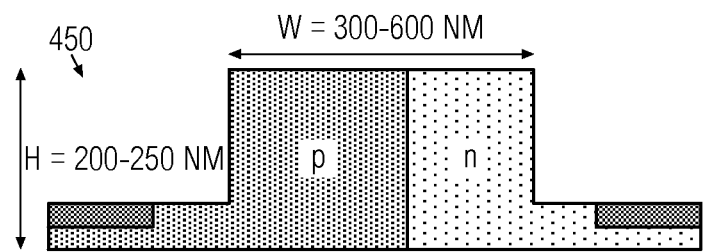

FIG. 4 shows schematic cross-sectional views of optimized structures 400, 430 of optical modulators of various embodiments and a pn junction 450 of a conventional optical modulator.

The optimized structure 400 is similar to that of the optical modulator 300 (FIG. 3A) while the optimized structure 430 is similar to that of the optical modulator 340 (FIG. 3B). The optimised structure 400 includes a pn junction including a p-type portion 402 and an n-type portion 404, in which a depletion region, as represented by the dashed box 406, may be formed. The depletion region 406 may confine optical modes and the depletion region 406 may act as a waveguide to propagate the optical modes.

The optimized structure 400 includes a first intrinsic region 408 and a second intrinsic region 410, where the depletion region 406 is disposed between the first intrinsic region 408 and the second intrinsic region 410. The p-type portion 402 and the n-type portion 404 of the junction may form a rib waveguide. The p-type portion 402, the n-type portion 404, the first intrinsic region 408 and the second intrinsic region 410 form a rib structure.

The p-type portion 402 is designated as part R2 having a width $W_p$, while the n-type portion 404 is designated as part R3 having a width $W_n$. The doping level outside of the depletion region 406 are reduced, and are designated as parts R1 (i.e. first intrinsic region 408) and R4 (i.e. second intrinsic region 410). It should be appreciated that doping profiles other than that as described may be provided.

The optimised structure 400 further includes a p-type slab 412 coupled to the p-type portion 402, where the p-type portion 402 and the first intrinsic region 408 are on the p-type slab 412. The optimised structure 400 further includes an n-type slab 414 coupled to the n-type portion 404, where the n-type portion 404 and the second intrinsic region 410 are on the n-type slab 414. As shown in FIG. 4, the depletion region 406 may extend into the p-type slab 412 and the n-type slab 414 of the optimized structures 400, 430 of optical modulators of various embodiments.

The optimised structure 430 includes a pn junction including a p-type portion 402 (of width $W_p$) and an n-type portion 404 (of width $W_n$), in which a depletion region, as represented by the dashed box 406, may be formed. The optimized structure 430 includes an intrinsic region 432 formed or arranged to substantially or partially surround the depletion region 432. The intrinsic region 432 may include a portion 434 contacting or adjacent to the p-type portion 402 and another portion 436 contacting or adjacent the n-type portion 404.

The optimised structure 430 further includes a p-type slab 412 coupled to the p-type portion 402, where the p-type portion 402 and the intrinsic region portion 434 are on the p-type slab 412. The optimised structure 430 further includes an n-type slab 414 coupled to the n-type portion 404, where the n-type portion 404 and the intrinsic region portion 436 are on the n-type slab 414.

In various embodiments of the optimised structures 400, 430, the p-type slab 412 may have dopants at a concentration at least substantially equal or higher than a concentration of dopants in the p-type portion 402, and/or the n-type slab 414 may have dopants at a concentration substantially equal or higher than a concentration of dopants in the n-type portion 404.

The pn junctions of the optimised structures 400, 430 and the pn junction 450 may be reversed biased.

Changes in the free holes' concentration play a main role in an optical modulator, for example when acting as a phase shifter. In order to examine the performance of the optical modulators of various embodiments, the embodiment of the optimised structure 400 was used as an example for simulation, and the pn junction was set near the centre of the waveguide, with approximately 25 nm shift to the n-type side and the performance determined for different $W_p$ widths while maintaining $W_n$ at about 100 nm.

In an embodiment, the doping level or concentration of the p-type slab 412 and the n-type slab 414 may be approximately $1.0 \times 10^{18}$ cm$^{-3}$, the doping level or concentration of the p-type portion 402 and the n-type portion 404 may be approximately $5.0 \times 10^{18}$ cm$^{-3}$ while the doping level or concentration of the first intrinsic region 408 and the second intrinsic region 410, both after compensated doping, may be approximately $1.0 \times 10^{16}$ cm$^{-3}$. Such a doping profile may be achieved by suitable modifications of ion implantation conditions, for example.

Simulation may be performed according to the model as described in X. G. Tu, et al., *IEEE J. Lightwave. Technology*, 24, 1000-1007 (2006), which is hereby incorporated by reference. The width of the rib structure, $W_{rib}$, is about 450 nm. However, it should be appreciated that $W_{rib}$ may be in a range of between about 300 nm and about 600 nm, e.g. between about 300 nm and about 400 nm or between about 400 nm and about 500 nm.

Figure 5:
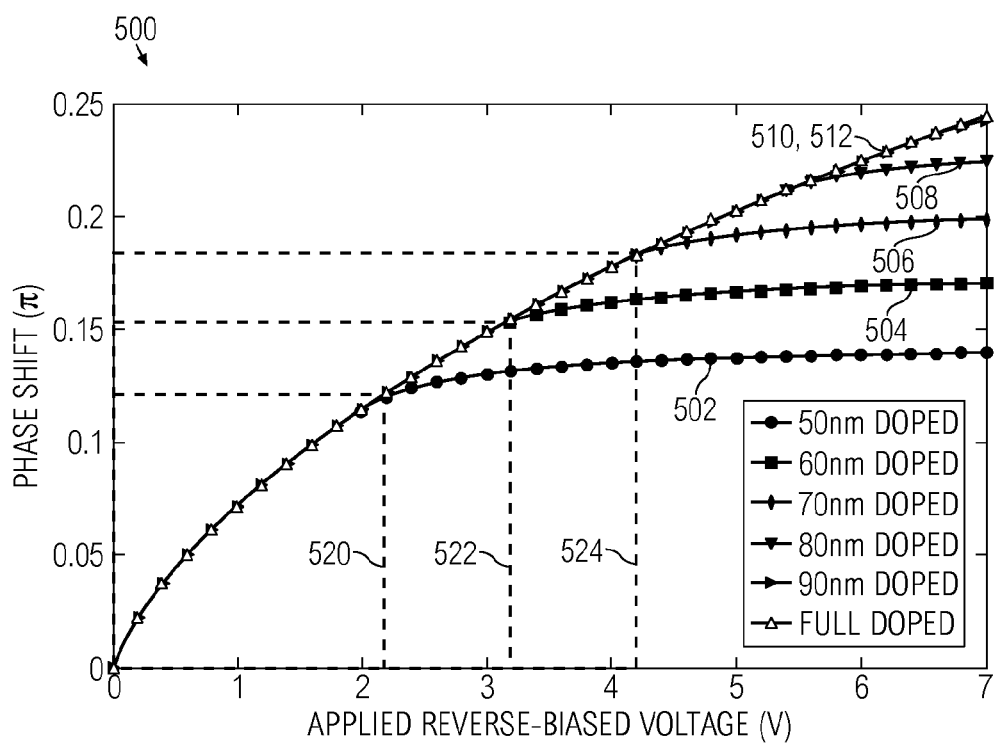
FIG. 5 shows a plot of static performance of a phase shifter with a length of about 1 mm for different $W_p$ widths, according to various embodiments.

FIG. 5 shows a plot 500 of static performance of a phase shifter with a length, L, of about 1 mm for different $W_p$ widths, according to various embodiments. The plot 500 illustrates the simulation results for modulation efficiency. The plot 500 shows the results for $W_p$=50 nm 502, $W_p$=60 nm 504, $W_p$=70 nm 506, $W_p$=80 nm 508 and $W_p$=90 nm 510. For comparison purposes, the results for full doped conditions 512 denoting the conventional pn junction modulator are included (e.g. having pn junction 450 of FIG. 4). The results for the full doped condition 512 and $W_p$=90 nm 510 overlap with each other for the range of applied reverse-biased voltage of 0 to about 7 V. In various embodiments, the phase shifter may operate at a wavelength, λ, of about 1.55 μm.

As shown in FIG. 5, there are respective threshold voltages for different $W_p$ values, where each threshold voltage separates the result for each $W_p$ value into two regions on the phase shift. Below the threshold voltage, the phase shifter (optical modulator) of various embodiments have similar modulation efficiency with that of the conventional modulator (i.e. having result 512). After the threshold voltage, free holes lying within the p-type active region may be fully depleted and the phase shift is saturated. Using $W_p$=70 nm 506 as an example, the threshold voltage is about −4.2 V (i.e. reverse bias voltage of about 4.2 V).

In various embodiments, for a phase shifter with a wider doping region, a higher amplitude of applied voltage (reverse bias voltage) is necessary to fully deplete the free holes in the p-doped region (i.e. p-type active region), resulting in a higher threshold voltage, as shown in FIG. 5.

As conventional modulator usually works under a minus (reverse) bias voltage of about 3 V (i.e. −3 V), the optical modulators of various embodiments maintain at least substantially similar modulation efficiency with that of the conventional modulator when the reverse bias voltage is below the threshold voltage. In various embodiments, the modulation efficiency ($V_\pi L_\pi$) of the phase shifter or optical modulator of various embodiments may reach about 1.8 Vcm. $V_\pi$ refers to the applied voltage under which a π shift may be realized within a given length of phase shifter, while $L_\pi$ refers to the length of the phase shifter under which a π shift may be realized for a given applied voltage.

As examples, the dashed boxes 520, 522, 524, illustrate the operation windows for the optical modulators with $W_p$=50 nm 502, $W_p$=60 nm 504 and $W_p$=70 nm 506, respectively.

Figure 6:
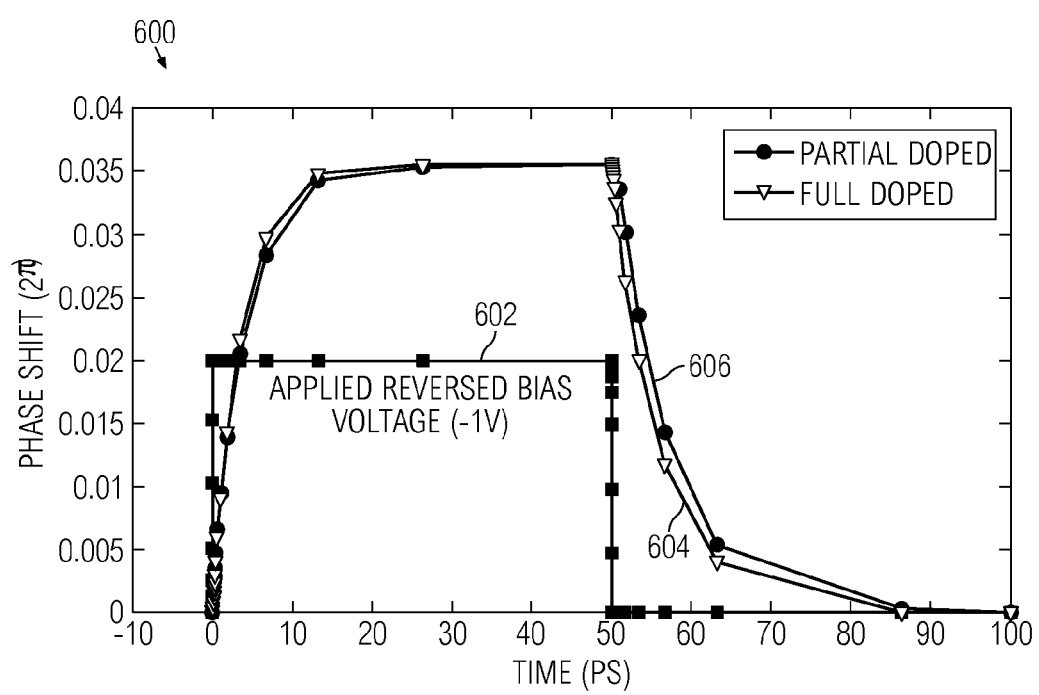
FIG. 6 shows a plot of transient response of a modulator, according to various embodiments.

FIG. 6 shows a plot 600 of transient response of a modulator, according to various embodiments. The plot 600 illustrates the simulation results for switching speed. The plot 600 is obtained via simulation by applying a square wave voltage driving pulse 602 with a voltage, $V_{pp}$, with a peak-to-peak amplitude of about 1 V, and a bias voltage $V_0$=−1.5 V, a 0 to 100 percent ramp time of about 1 ps and a duration of about 50 ps.

The rise and fall time of the fully doped condition 604 and the 50 nm doped (partial doped; $W_p$=50 nm) condition 606 are $t_{rise}$=4.8 ps, $t_{fall}$=8.8 ps, and $t_{rise}$=6.8 ps, $t_{fall}$=10.2 ps respectively. The rise and fall times are defined as the times for the phase shift to change from about 10% to about 90%, and from about 90% to about 10% of its maximum amplitude, respectively.

As shown in FIG. 6, the switching speed for the full doped condition 604 is faster than the 50 nm doped condition 606, which may be described by considering the RC time constant (i.e. resistance (R)×capacitance (C)) of the two conditions. At below the threshold voltage, both conditions may have at least substantially similar capacitance, C. For the 50 nm doped condition 606, the compensated doping regions may have a larger resistance, R, compared to the full doped condition 604, resulting in a longer time constant for the 50 nm doped condition 606, and therefore a relatively slower switching speed. However, while the switching speed of the full doped condition 604 is relatively faster, the switching speed is not much degraded for the 50 nm doped condition 606 compared to the full doped condition 604.

The 3 dB bandwidth may reach about 35 GHz, which may enable a data transmission rate of up to about 70 Gbit/s. The 3 dB bandwidth is defined as BW3 dB=0.35/$t_{MAX}$, where $t_{MAX}$ is the longer time of either the fall time or the rise time.

Figure 7:
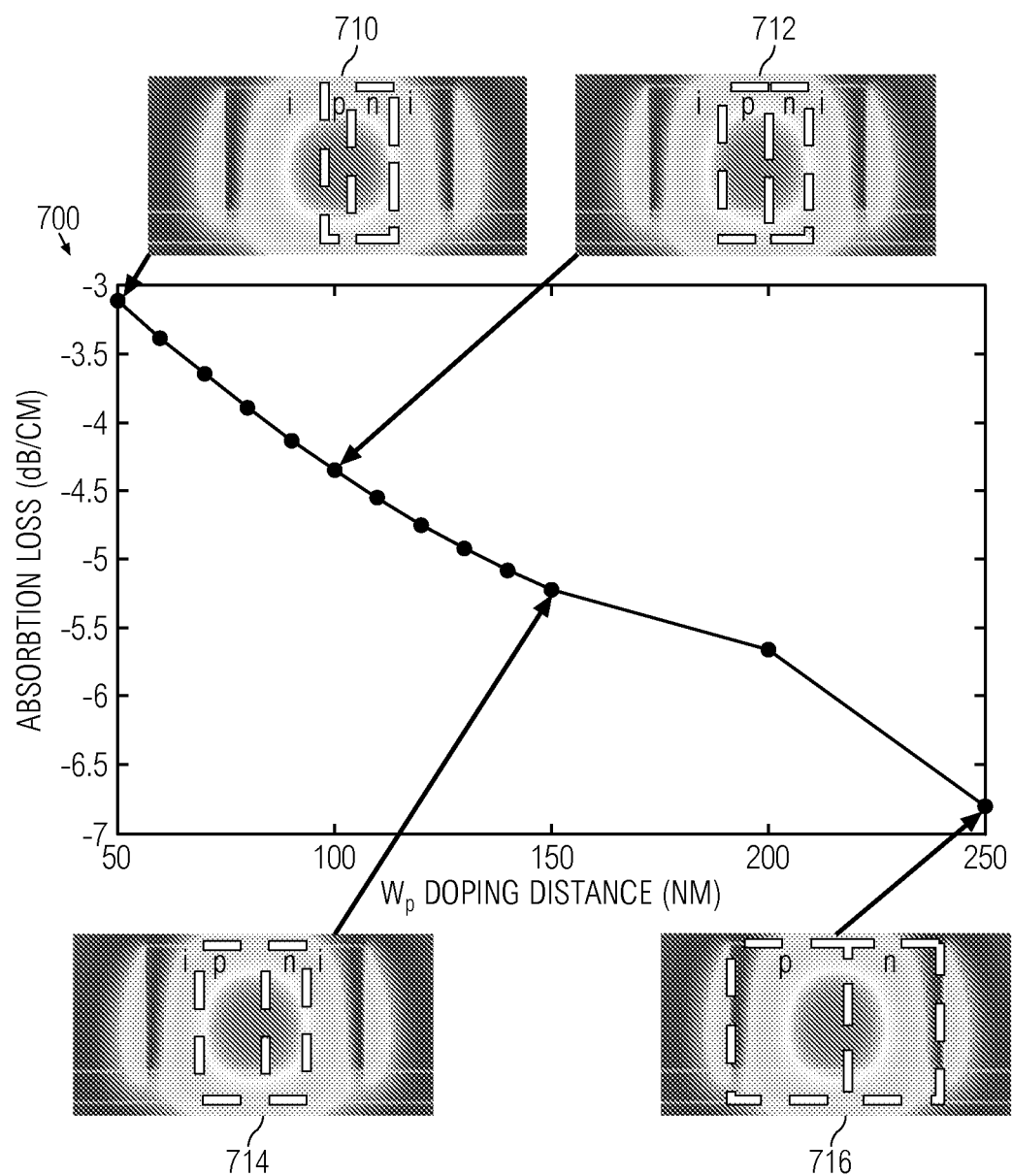
FIG. 7 shows a plot of absorption loss for different $W_p$ widths, according to various embodiments.

FIG. 7 shows a plot 700 of absorption loss for different $W_p$ widths, according to various embodiments. The plot 700 is obtained via a simulation for a wavelength, λ, of about 1.55 m. The structures 710, 712, 714, 716 with the corresponding optical modes are shown, as examples, for conditions where $W_p$=50 nm, $W_p$=100 nm, $W_p$=150 nm and $W_p$=250 nm (full doped condition; conventional modulator) respectively.

As shown in FIG. 7, there is an approximate 3.6 dB/cm improvement in the absorption loss, when comparing the result for the 50 nm doped structure 710 having an absorption loss of about 3.1 dB/cm, and the full doped structure 716 having an absorption loss of about 6.8 dB/cm. A decrease in the width, $W_p$, of the p-type portion of the junction results in a lower loss. Therefore, optimizing the doping level of the active region or junction may result in smaller absorption loss. The result shows an approximate 40% absorption loss reduction in the optical modulators of various embodiments, while maintaining the modulation efficiency and switching speed similar to conventional modulators. In addition, the absorption loss of the conventional modulator (full doped condition) was measured to be about 10 dB/cm (result not shown).

From the results of FIGS. 5 to 7, the optimized structures of the optical modulators of various embodiments may realize lower absorption loss with minimal or no degradation in the modulation efficiency and switching speed. This may enable the integration of silicon modulators with other optical devices. The silicon optical modulators of various embodiments may be utilized in other devices with similar functions such as optical switches.

The methods of fabricating the optical modulators of various embodiments will now be described by way of the following non-limiting examples. The fabrication method is based on the compensated doping method.

Figure 8:
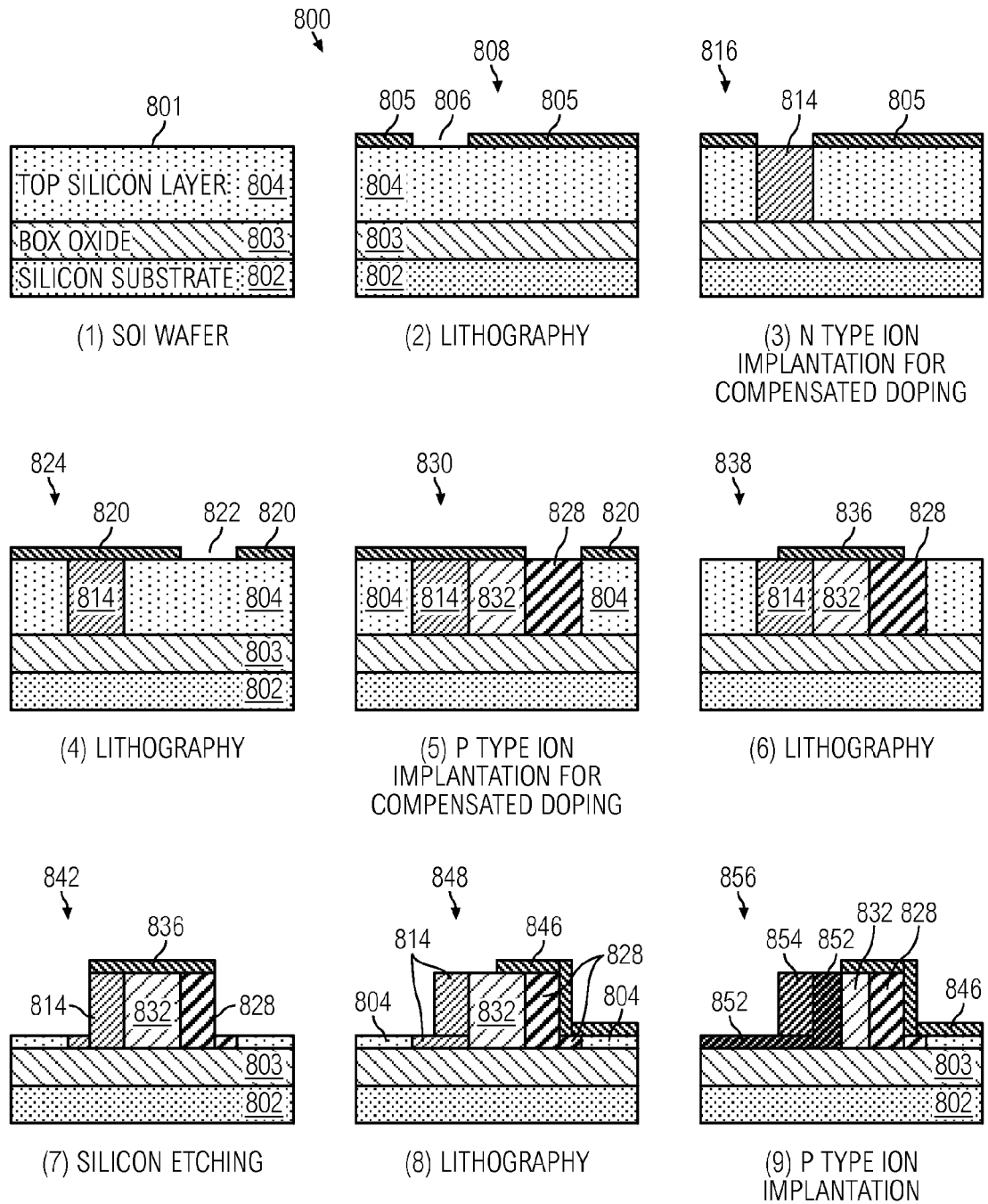
FIG. 8 shows cross-sectional views of a fabrication process to form an optical modulator, according to an embodiment.
Figure 8:
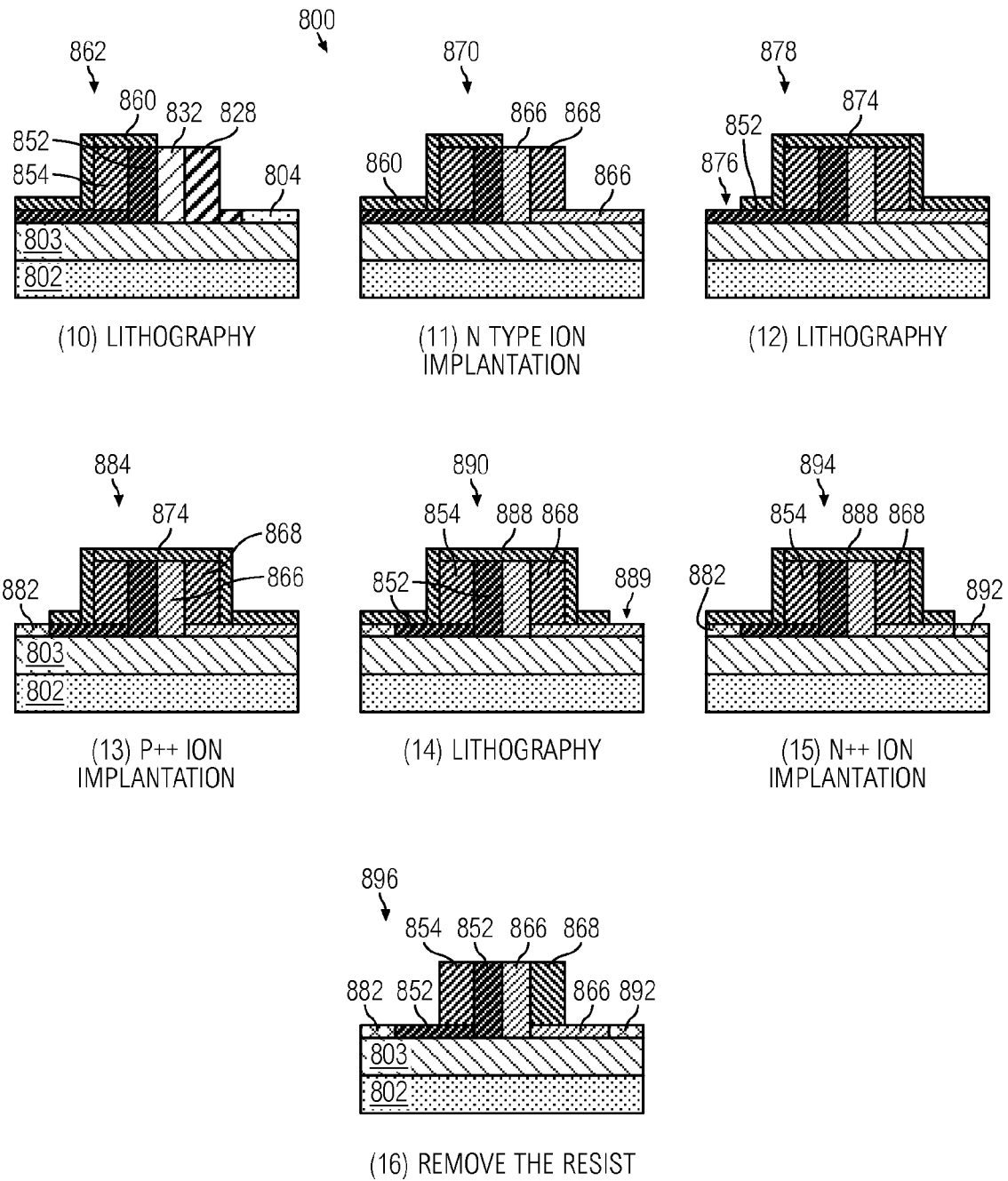

FIG. 8 shows cross-sectional views of a fabrication process 800 to form an optical modulator, according to an embodiment. The fabrication process 800 may be employed to fabricate the optical modulators 300 (FIG. 3A), 360 (FIG. 3C), 400 (FIG. 4) and their equivalents.

The fabrication process 800 begins at (1) with a silicon-on-insulator (SOI) wafer 801, including a silicon (Si) substrate 802, a buried oxide (BOX) layer (e.g. $SiO_2$) 803 and a top silicon layer 804.

At (2), a lithography process (e.g. photolithography) is performed, by depositing a layer of photoresist 805, patterning the layer of photoresist 805 and then opening a window 806 over the top silicon layer 804, by developing and removing a portion of the photoresist 805. The structure 808 may be obtained.

At (3), the structure 808 may be subjected to an n-type (donor ions or dopants) ion implantation process for compensated doping. The n-type ions penetrate into the top silicon layer 804 until the BOX layer 803, via the window 806, thereby forming an n-type region 814. The structure 816 may be obtained. The photoresist 805 may then be removed.

At (4), a lithography process (e.g. photolithography) is performed, by depositing a layer of photoresist 820, patterning the layer of photoresist 820 and then opening a window 822 over the top silicon layer 804, by developing and removing a portion of the photoresist 820. The structure 824 may be obtained.

At (5), the structure 824 may be subjected to a p-type (acceptor ions or dopants) ion implantation process for compensated doping. The p-type ions penetrate into the top silicon layer 804 until the BOX layer 803, via the window 822, thereby forming a p-type region 828. The structure 830 may be obtained, including the n-type region 814 and the p-type region 828 sandwiching a portion 832 of the top silicon layer 804. The portion 832 may be an at least substantially central portion. The photoresist 820 may then be removed.

At (6), a lithography process (e.g. photolithography) is performed, by depositing a layer of photoresist 836, patterning the layer of photoresist 836 and developing and removing portions of the photoresist 836 to retain the photoresist 836 over the silicon portion 832, a part of the n-type region 814 and a part of the p-type region 828. The structure 838 may be obtained.

At (7), a silicon etching process is performed on the structure 838, thereby etching portions of the silicon material not covered by the photoresist 836. The part of the n-type region 814 and the part of the p-type region 828 not covered by the photoresist 836 are etched. As a result, both the n-type region 814 and the p-type region 828 have reduced widths, compared to the structure 838. The etching process is stopped before the BOX layer 803 is reached, thereby leaving a layer of silicon material over the BOX layer 803. The structure 842 may be obtained. The photoresist 836 may then be removed.

At (8), a lithography process (e.g. photolithography) is performed, by depositing a layer of photoresist 846, patterning the layer of photoresist 846 and developing and removing portions of the photoresist 846 to retain the photoresist 846 over the p-type region 828, the silicon layer 804 adjacent to it, and a part of the silicon portion 832. The structure 848 may be obtained.

At (9), the structure 848 may be subjected to a p-type (acceptor ions) ion implantation process. The p-type ions penetrate into the n-type region 814, the silicon layer 804 adjacent to it and the part of the silicon portion 832 not covered by the photoresist 846, until the BOX layer 803, thereby forming a p-type portion 852 and a compensated region 854. The structure 856 may be obtained. The photoresist 846 may then be removed.

As the compensated region 854 contains n-type ions (from the process at (3)), the implantation of p-type ions at (9) is compensated by the n-type ions present. As a result, the compensated region 854 has p-type ions or dopants at a concentration or level lower than the concentration of the p-type dopants in the p-type portion 852. The compensated region 854 may be designated as an intrinsic region.

At (10), a lithography process (e.g. photolithography) is performed, by depositing a layer of photoresist 860, patterning the layer of photoresist 860 and developing and removing portions of the photoresist 860 to retain the photoresist 860 over the p-type portion 852 and the compensated region (intrinsic region) 854. The structure 862 may be obtained.

At (11), the structure 862 may be subjected to an n-type (donor ions) ion implantation process. The n-type ions penetrate into the p-type region 828, the silicon layer 804 adjacent to it and the part of the silicon portion 832 not covered by the photoresist 860, until the BOX layer 803, thereby forming an n-type portion 866 and a compensated region 868. The structure 870 may be obtained. The photoresist 860 may then be removed.

As the compensated region 868 contains p-type ions (from the process at (5)), the implantation of n-type ions at (11) is compensated by the p-type ions present. As a result, the compensated region 868 has n-type ions or dopants at a concentration or level lower than the concentration of the n-type dopants in the n-type portion 866. The compensated region 868 may be designated as an intrinsic region.

At (12), a lithography process (e.g. photolithography) is performed, by depositing a layer of photoresist 874, patterning the layer of photoresist 874 and then opening a window 876 over a portion of the p-type portion 852, by developing and removing a portion of the photoresist 874. The structure 878 may be obtained.

At (13), the structure 878 may be subjected to a p++(acceptor ions) ion implantation process. The p-type ions penetrate into the p-type portion 852 not covered by the photoresist 874, until the BOX layer 803, thereby forming a p++-doped region 882. The p++-doped region 882 may be heavily doped with p-type ions and has p-type ions or dopants at a concentration or level higher than the concentrations of the p-type portion 852 and the intrinsic region 854. The structure 884 may be obtained. The photoresist 874 may then be removed.

At (14), a lithography process (e.g. photolithography) is performed, by depositing a layer of photoresist 888, patterning the layer of photoresist 888 and then opening a window 889 over a portion of the n-type portion 866, by developing and removing a portion of the photoresist 888. The structure 890 may be obtained.

At (15), the structure 890 may be subjected to an n++ (donor ions) ion implantation process. The n-type ions penetrate into the n-type portion 866 not covered by the photoresist 888, until the BOX layer 803, thereby forming an n++-doped region 892. The n++-doped region 892 may be heavily doped with n-type ions and has n-type ions or dopants at a concentration or level higher than the concentrations of the n-type portion 866 and the compensated region (intrinsic region) 868. The structure 894 may be obtained.

At (16), the photoresist 888 is then removed and the structure 896 may be obtained. The structure 896 includes a depletion region that may be formed by the pn junction formed between the adjacent p-type portion 852 and the n-type portion 866. The depletion region is disposed between the intrinsic regions 854, 868.

Figure 9:
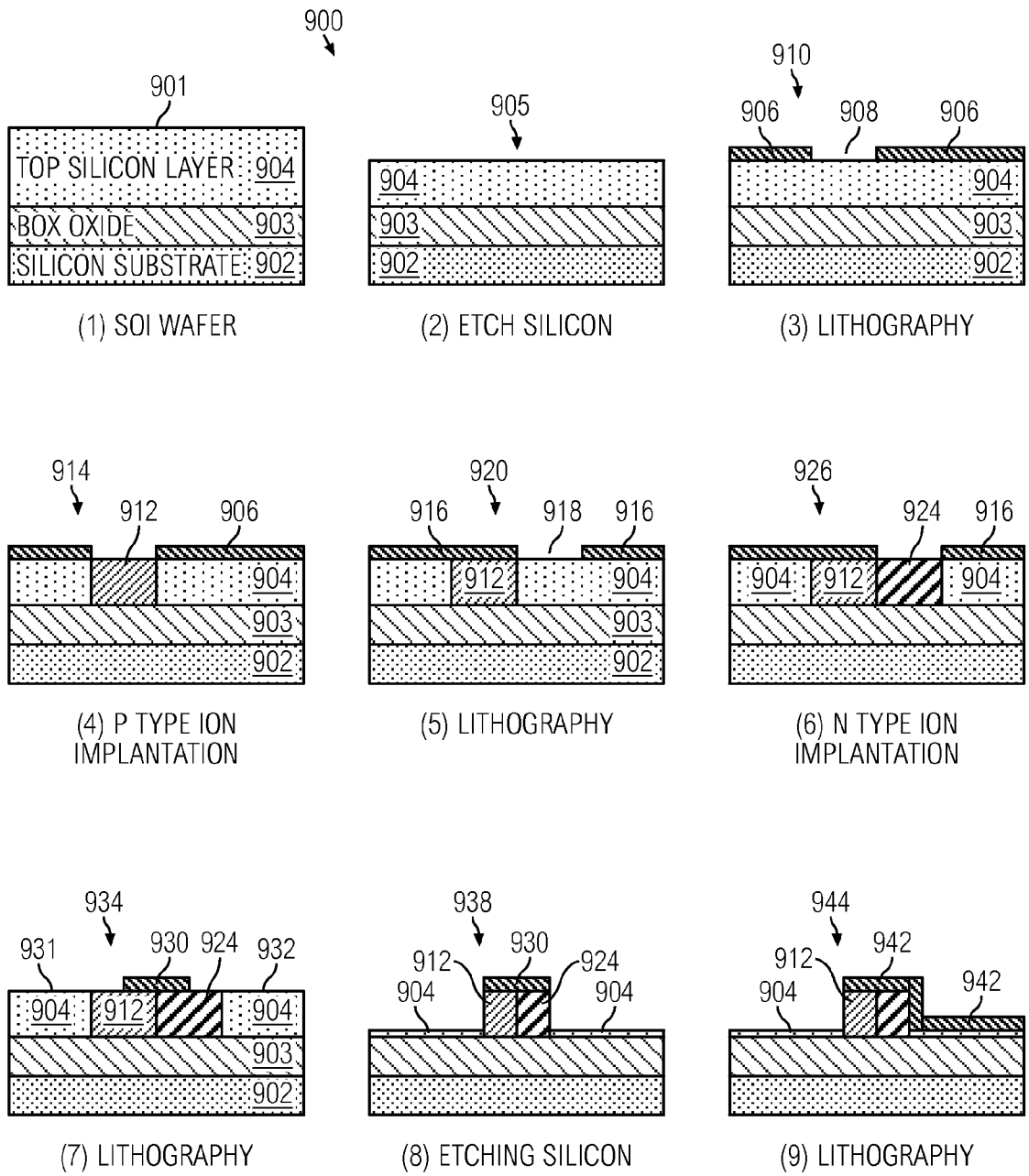
FIG. 9 shows cross-sectional views of a fabrication process to form an optical modulator, according to another embodiment.
Figure 9:
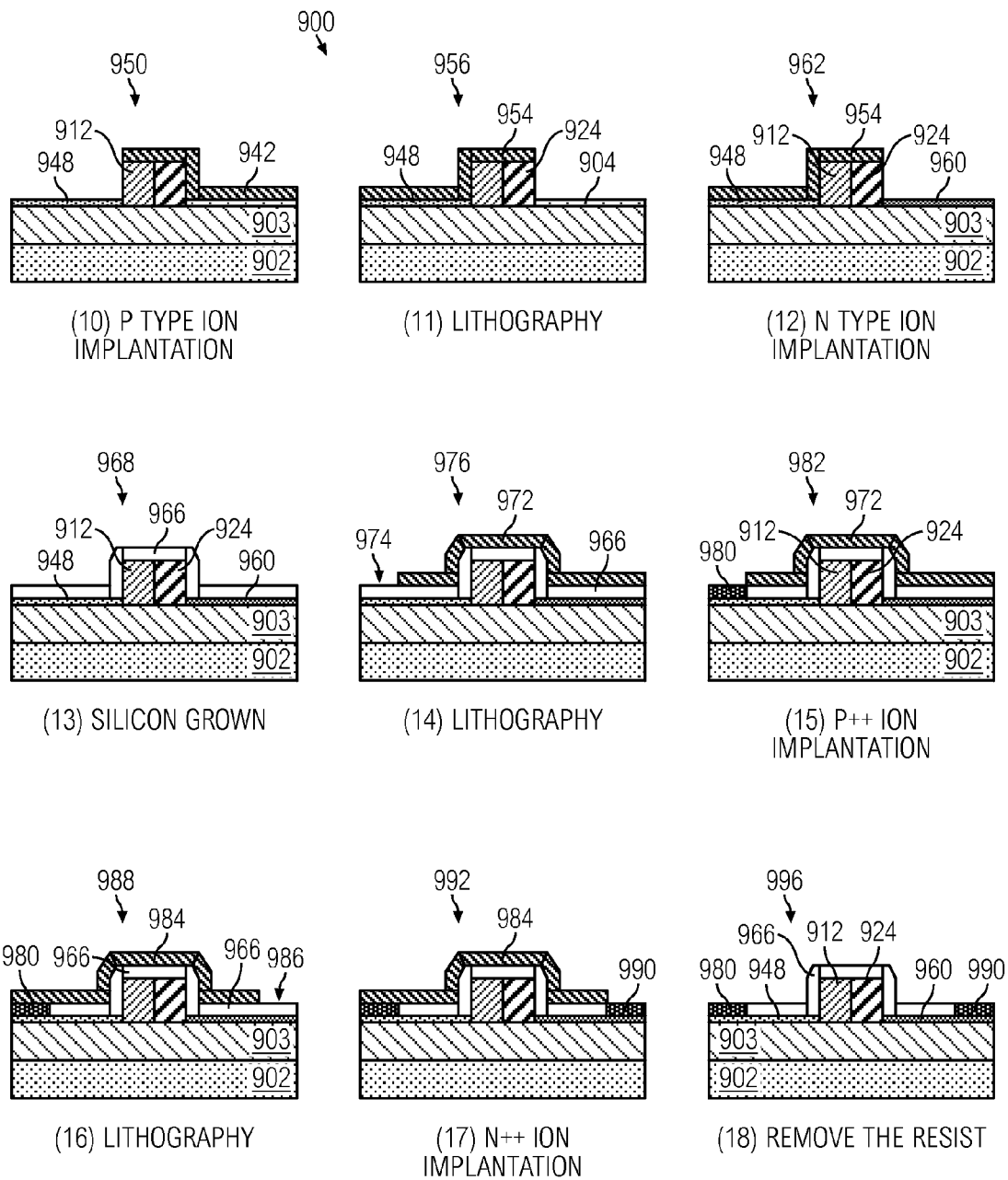

FIG. 9 shows cross-sectional views of a fabrication process 900 to form an optical modulator, according to another embodiment. The fabrication process 900 may be employed to fabricate the optical modulators 340 (FIG. 3B), 430 (FIG. 4) and their equivalents.

The fabrication process 900 begins at (1) with a silicon-on-insulator (SOI) wafer 901, including a silicon (Si) substrate 902, a buried oxide (BOX) layer (e.g. $SiO_2$) 903 and a top silicon layer 904.

At (2), a silicon etching process is performed on the SOI wafer 901 to thin the top silicon layer 904. The structure 905 may be obtained.

At (3), a lithography process (e.g. photolithography) is performed, by depositing a layer of photoresist 906, patterning the layer of photoresist 906 and then opening a window 908 over the top silicon layer 904, by developing and removing a portion of the photoresist 906. The structure 910 may be obtained.

At (4), the structure 910 may be subjected to a p-type (acceptor ions or dopants) ion implantation process. The p-type ions penetrate into the top silicon layer 904 until the BOX layer 903, via the window 908, thereby forming a p-type portion 912. The structure 914 may be obtained. The photoresist 906 may then be removed.

At (5), a lithography process (e.g. photolithography) is performed, by depositing a layer of photoresist 916, patterning the layer of photoresist 916 and then opening a window 918 over the top silicon layer 904, by developing and removing a portion of the photoresist 916. The structure 920 may be obtained.

At (6), the structure 920 may be subjected to an n-type (donor ions or dopants) ion implantation process. The n-type ions penetrate into the top silicon layer 904 until the BOX layer 903, via the window 918, thereby forming an n-type portion 924. The structure 926 may be obtained. The photoresist 916 may then be removed.

At (7), a lithography process (e.g. photolithography) is performed, by depositing a layer of photoresist 930, patterning the layer of photoresist 930 and then opening windows 931, 932 over the top silicon layer 904 and parts of the p-type portion 912 and the n-type portion 924, by developing and removing portions of the photoresist 930. The structure 934 may be obtained. The photoresist 930 covers an at least substantially central portion of the adjacent p-type portion 912 and n-type portion 924.

At (8), a silicon etching process is performed on the structure 934, thereby etching portions of the silicon material not covered by the photoresist 930. The part of the p-type portion 912 and the part of the n-type portion 924 not covered by the photoresist 930 are etched. As a result, both the p-type portion 912 and the n-type portion 924 have reduced widths, compared to the structure 934. The etching process is stopped before the BOX layer 903 is reached, thereby leaving a layer of silicon material over the BOX layer 903. The structure 938 may be obtained. The photoresist 930 may then be removed.

At (9), a lithography process (e.g. photolithography) is performed, by depositing a layer of photoresist 942, patterning the layer of photoresist 942 and developing and removing portions of the photoresist 942 to retain the photoresist 942 over the p-type portion 912, the n-type portion 924 and the silicon layer 904 adjacent to the n-type portion 924, thereby exposing the silicon layer 904 adjacent to the p-type portion 912. The structure 944 may be obtained. Alternatively, the photoresist 930 is not removed after the process at (8) and the photoresist 942 may be deposited over the photoresist 930.

At (10), the structure 944 may be subjected to a p-type (acceptor ions) ion implantation process. The p-type ions penetrate into the silicon layer 904 adjacent to the p-type portion 912, until the BOX layer 903, thereby forming a p-type slab 948. The structure 950 may be obtained. The photoresist 942 may then be removed.

The p-type slab 948 may be an extension of the p-type portion 912 and/or may be equivalent to the p-type slab 412 of FIG. 4. The p-type slab 948 may have p-type ions or dopants at a concentration or level equal to or higher than the concentration of the p-type portion 912.

At (11), a lithography process (e.g. photolithography) is performed, by depositing a layer of photoresist 954, patterning the layer of photoresist 954 and developing and removing portions of the photoresist 954 to retain the photoresist 954 over the p-type portion 912, the n-type portion 924 and the p-type slab 948, thereby exposing the silicon layer 904 adjacent to the n-type portion 924. The structure 956 may be obtained.

At (12), the structure 956 may be subjected to an n-type (donor ions) ion implantation process. The n-type ions penetrate into the silicon layer 904 adjacent to the n-type portion 924, until the BOX layer 903, thereby forming an n-type slab 960. The structure 962 may be obtained. The photoresist 954 may then be removed.

The n-type slab 960 may be an extension of the n-type portion 924 and/or may be equivalent to the n-type slab 414 of FIG. 4. The n-type slab 960 may have n-type ions or dopants at a concentration or level equal to or higher than the concentration of the n-type portion 924.

At (13), a layer of silicon (Si) 966 may be grown over the p-type portion 912, the n-type portion 924, the p-type slab 948 and the n-type slab 960, for example using chemical vapour deposition methods that may grow poly-silicon, or epitaxial overgrowth that may grow single crystal silicon.

At (14), a lithography process (e.g. photolithography) is performed, by depositing a layer of photoresist 972, patterning the layer of photoresist 972 and then opening a window 974 over a portion of the Si layer 966, by developing and removing a portion of the photoresist 972. The structure 974 may be obtained.

At (15), the structure 976 may be subjected to a p++(acceptor ions) ion implantation process. The p-type ions penetrate into the Si layer 966 not covered by the photoresist 972, until the p-type slab 948, thereby forming a p++-doped region 980. The p++-doped region 980 may be heavily doped with p-type ions and has p-type ions or dopants at a concentration or level higher than the concentrations of the p-type portion 912 and the p-type slab 948. The structure 982 may be obtained. The photoresist 972 may then be removed.

At (16), a lithography process (e.g. photolithography) is performed, by depositing a layer of photoresist 984, patterning the layer of photoresist 984 and then opening a window 986 over a portion of the Si layer 966, by developing and removing a portion of the photoresist 984. The structure 988 may be obtained.

At (17), the structure 988 may be subjected to an n++ (donor ions) ion implantation process. The n-type ions penetrate into the Si layer 966 not covered by the photoresist 984, until the n-type slab 960, thereby forming an n++-doped region 990. The n++-doped region 990 may be heavily doped with n-type ions and has n-type ions or dopants at a concentration or level higher than the concentrations of the n-type portion 924 and the n-type slab 960. The structure 992 may be obtained.

At (18), the photoresist 984 is then removed and the structure 996 may be obtained. The structure 996 includes a depletion region that may be formed by the pn junction formed between the p-type portion 912 and the n-type portion 924, and the Si layer (intrinsic region) 966 configured to substantially or partially surround the depletion region.

The optimisation of the doping profile will now be described by way of the following non-limiting examples.

Using the optical modulators 300 (FIG. 3A) and 400 (FIG. 4) as examples, the cross-section of the optimized modulators may be divided into four parts or regions, R1, R2, R3, and R4, where R1 refers to the first intrinsic region 312 (FIG. 3A), 408 (FIG. 4), R2 refers to the p-type portion 308 of the junction 306 (FIG. 3A), p-type portion 402 (FIG. 4), R3 refers to n-type portion 310 of the junction 306 (FIG. 3A), n-type portion 404 (FIG. 4), and R4 refers to second intrinsic region 314 (FIG. 3A), 410 (FIG. 4).

The ion implantation conditions for the different regions may be that as shown in Table 1. The implanted dopants may be activated using rapid thermal anneal (RTA) at a temperature of about 1030° C. for a duration (diffuse time) of about 5 seconds.

TABLE 1

Ion implantation condition of different regions R1, R2, R3 and R4, of the cross section of the silicon modulator, according to various embodiments.

| Doping region | P-type doping (Ion = $B^{3+}$) | N-type Doping (Ion = $P^{3-}$) |
|---|---|---|
| R1 | Dose = $2.0 \times 10^{13}$ cm$^{-2}$, Energy = 80 keV | Dose = $1.5 \times 10^{12}$ cm$^{-2}$, Energy = 100 keV |
| R2 | Dose = $2.0 \times 10^{13}$ cm$^{-2}$, Energy = 80 keV | Not applicable |
| R3 | Not applicable | Dose = $2.0 \times 10^{13}$ cm$^{-2}$, Energy = 200 keV |
| R4 | Dose = $2.5 \times 10^{12}$ cm$^{-2}$, Energy = 30 keV | Dose = $2.0 \times 10^{13}$ cm$^{-2}$, Energy = 200 keV |

Figure 10A:
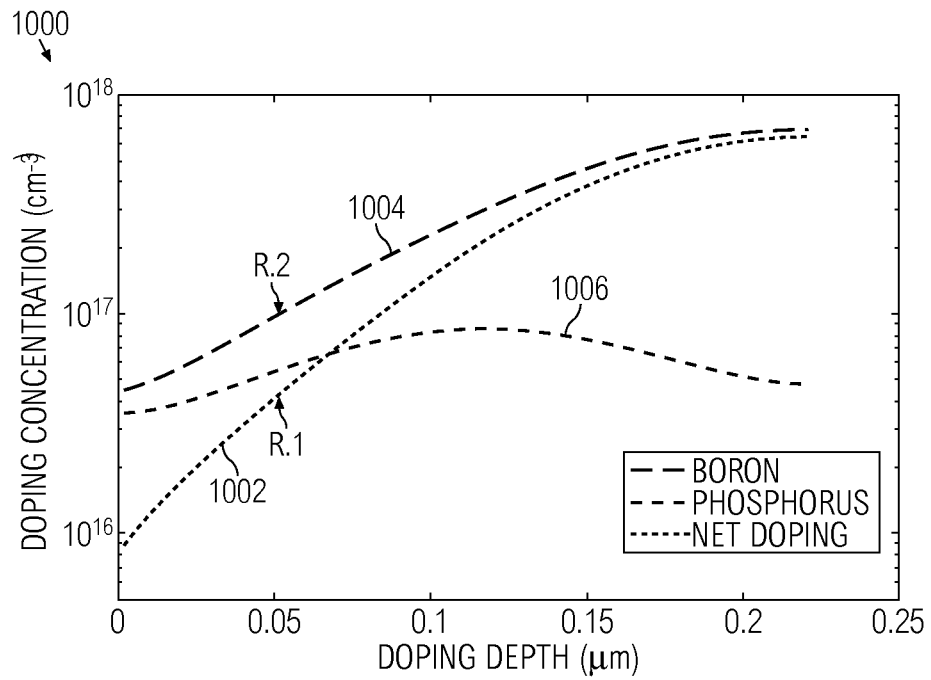
Figure 10B:
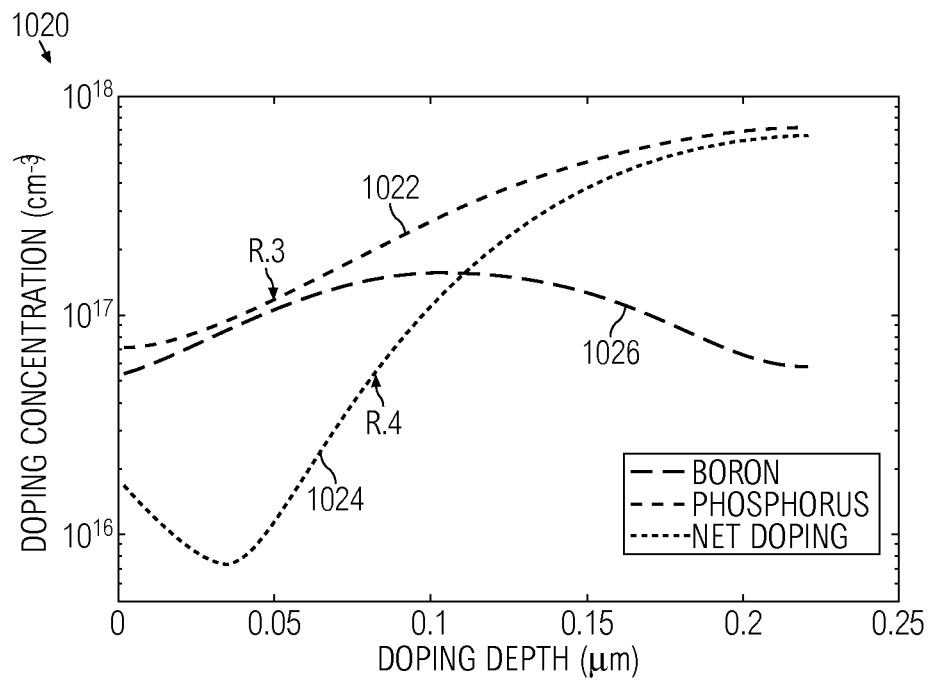
FIG. 10B shows a plot of simulated doping level profiles for R3 and R4, according to the conditions shown in Table 1.

The 1-D simulated doping profile curves corresponding to different doping conditions and regions are shown in FIGS. 10A and 10B. FIG. 10A shows a plot 1000 of simulated doping level profiles for R1 1002 and R2 1004, according to the conditions shown in Table 1.

The curve 1002 represents the doping profile for R1, while the curve 1004 represents the doping profile for R2. For the region R1, the curve 1002 represents the net doping, after compensated doping, as a result of the doping of boron ions with the doping profile curve 1004 and the doping of phosphorus ions with the doping profile curve 1006. There is a decrease in the doping concentration for R1, from before compensated doping (curve 1004) to after compensated doping (curve 1002).

FIG. 10B shows a plot 1020 of simulated doping level profiles for R3 1020 and R4 1024, according to the conditions shown in Table 1. The curve 1022 represents the doping profile for R3, while the curve 1024 represents the doping profile for R4. For the region R4, the curve 1024 represents the net doping, after compensated doping, as a result of the doping of phosphorus ions with the doping profile curve 1022 and the doping of boron ions with the doping profile curve 1026. There is a decrease in the doping concentration for R4, from before compensated doping (curve 1022) to after compensated doping (curve 1024).

As shown in FIGS. 10 A and 10B, the doping concentrations for R1, R2, R3 and R4 decrease as the doping depth decreases, from the top surface of the respective region into the region.

The experimental results will now be described by way of the following non-limiting examples. In order to demonstrate the absorption loss within different doping regions, different areas on a silicon-on-insulator (SOI) wafer were doped based on the parameters shown in Table. 1. Compensated doping was employed and different doping regions on the cross section of the modulator are split to fabricate straight waveguide and bend waveguide. The SOI wafer included a top silicon layer of a thickness of about 220 nm and a buried oxide layer of a thickness of about 2 μm. An intrinsic area with non-intentional doping (e.g. due to diffusion of free carriers) or an original undoped SOI was used as a reference point.

Channel waveguides with 500×220 nm² cross sections and corresponding ring resonators were fabricated with standard CMOS processes. Uniform nano-tips were integrated on the input and output ends of the waveguides as fiber-waveguide couplers. The channel waveguides were either compensated doped (e.g. using the R1 region with the conditions shown in Table 1 and the curve 1002 of FIG. 10A) with a dopant concentration of about $1.0 \times 10^{17}$ cm$^{-3}$, p-type doped (e.g. using the R2 region with the conditions shown in Table 1 and the curve 1004 of FIG. 10A) with a dopant concentration of about $5.0 \times 10^{17}$ cm$^{-3}$, or original undoped SOI (or non-intentional doped).

For comparison purposes, simulation was carried out based on the above described channel waveguides and the results are shown in Table 2.

TABLE 2

Simulation results for channel waveguides.

| | Compensated doped | p-type doped ($5.0 \times 10^{17}$ cm$^{-3}$) | Original undoped SOI |
|---|---|---|---|
| Absorption loss | 0.98 dB/cm | 1.79 dB/cm | ~0.15 dB/cm |
| Scattering loss (estimated) | ~2.2 dB/cm | ~2.2 dB/cm | ~2.2 dB/cm |
| Transmission loss | ~3.18 dB/cm | ~3.99 dB/cm | ~2.35 dB/cm |

Figure 11A:
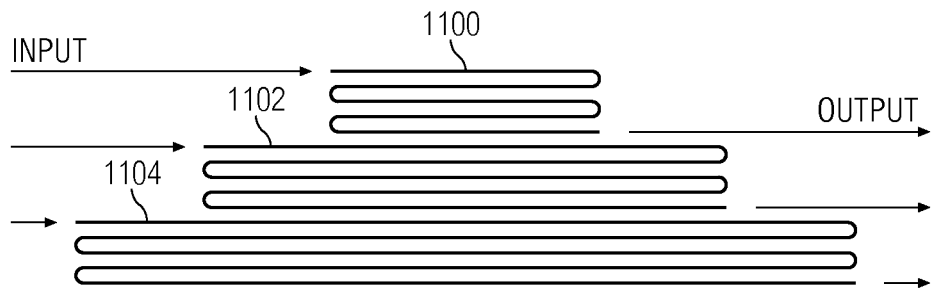
FIG. 11A shows a schematic layout of the straight waveguides for the determination of absorption loss using cutback method, according to various embodiments.

FIG. 11A shows a schematic layout of the straight waveguides 1100, 1102, 1104, for the determination of absorption loss using cutback method, according to various embodiments. As examples and not limitations, the lengths of the waveguides 1100, 1102, 1104, may be respectively about 2.5 mm, about 4.5 mm and about 6.5 mm. The absorption losses for silicon straight waveguides for different doping conditions were determined for different lengths, using the cutback method.

Figure 11B:
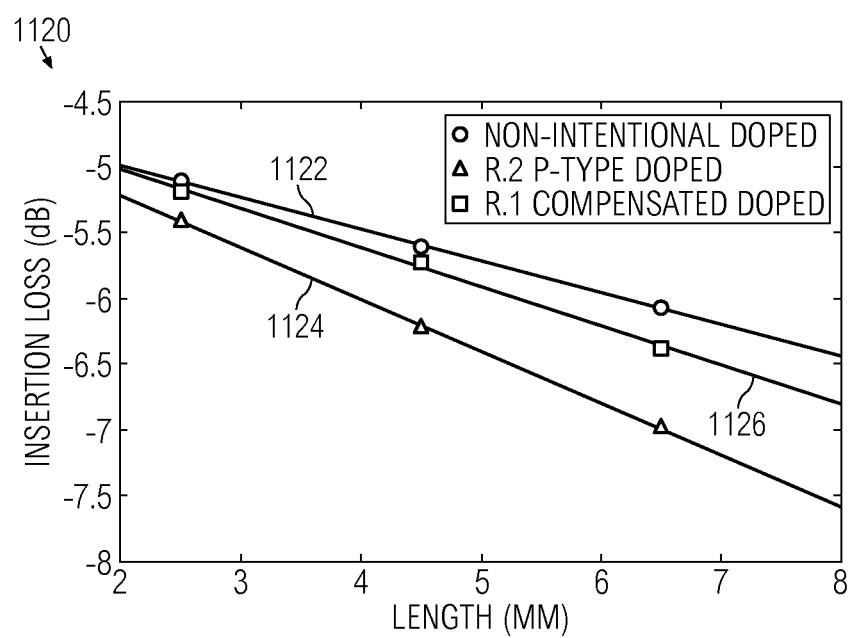
FIG. 11B shows a plot of the measured insertion losses of silicon straight waveguides for different lengths, according to various embodiments.

FIG. 11B shows a plot 1120 of the measured insertion losses of silicon straight waveguides for different lengths, according to various embodiments. The fitted propagation losses for non-intentional doped (or original undoped SOI) 1122, p-type doped 1124 and compensated doped 1126 straight waveguide are approximately 2.41 dB/cm (+/−0.08), 3.94 dB/cm (+/−0.09) and 2.97 dB/cm (+/−0.24) respectively. The measured lens fiber to waveguide coupling loss is approximately 2.2 dB/facet (+/−0.1). The improvement of the waveguide prepared with the compensated doping method is approximately 0.97 dB/cm as compared to the p-type doped waveguide.

The absorption loss through the transmission spectrum of a ring resonator (bend waveguide) was also determined. The absorption losses for the ring resonators for different doping conditions were determined through resonance spectra fitting.

A two cascaded one-ring-two-bus (1R2B) system was used, which have sharper transmission peaks than a corresponding one micro-ring resonator, and which may ameliorate situations where the shift of the absorption loss under different doping conditions is small.

Figure 12A:
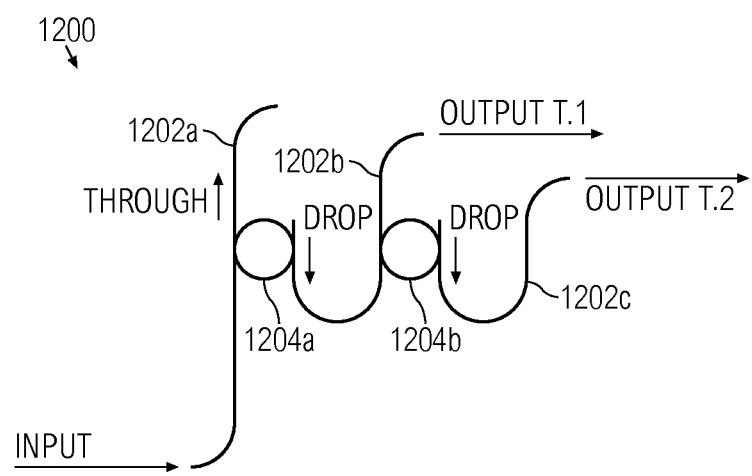
FIG. 12A shows a schematic layout of a double-ring resonator, according to various embodiments.

FIG. 12A shows a schematic layout of a double-ring resonator (two cascaded micro-ring resonator) 1200 for measurements, according to various embodiments. The double-ring resonator 1200 includes waveguides 1202a, 1202b, 1202c, coupled with two rings, ring a 1204a and ring b 1204b, each with a ring radius, R of about 20 μm and a waveguide to ring gap, d, of about 0.3 μm. As illustrated in FIG. 12, the input light with resonance frequency of ring a 1204a may be dropped and coupled with ring b 1204b, and the transmission and reflection of ring b 1204b may be outputted from output T.1 and output T.2 respectively.

Where ring a 1204a and the ring b 1204b have the same or substantially similar resonance frequency, the light dropped from output T.2 may have a higher extinction ratio than the light that is dropped from only ring a 1204a without ring b 1204b.

Where ring a 1204a and the ring b 1204b have different resonance frequencies, the outputs T.1 and T.2 may be obtained by a multiplication of their transfer matrix. According to the transfer matrix method and considering that ring a 1204a and ring b 1204b have a similar transmission coefficient, t, and a roundtrip loss, α, the outputs of T.1 and T.2 may be given as below.

$$T.1 = \frac{\alpha(1-|t|^2)^2}{(1-\alpha t^2)^2} \cdot \frac{t^2(1-\alpha)^2}{(1-\alpha t^2)^2};$$ (Equation 1)

$$T.2 = \frac{\alpha^2(1-|t|^2)^4}{(1-\alpha t^2)^4}.$$ (Equation 2)

Figure 12B:
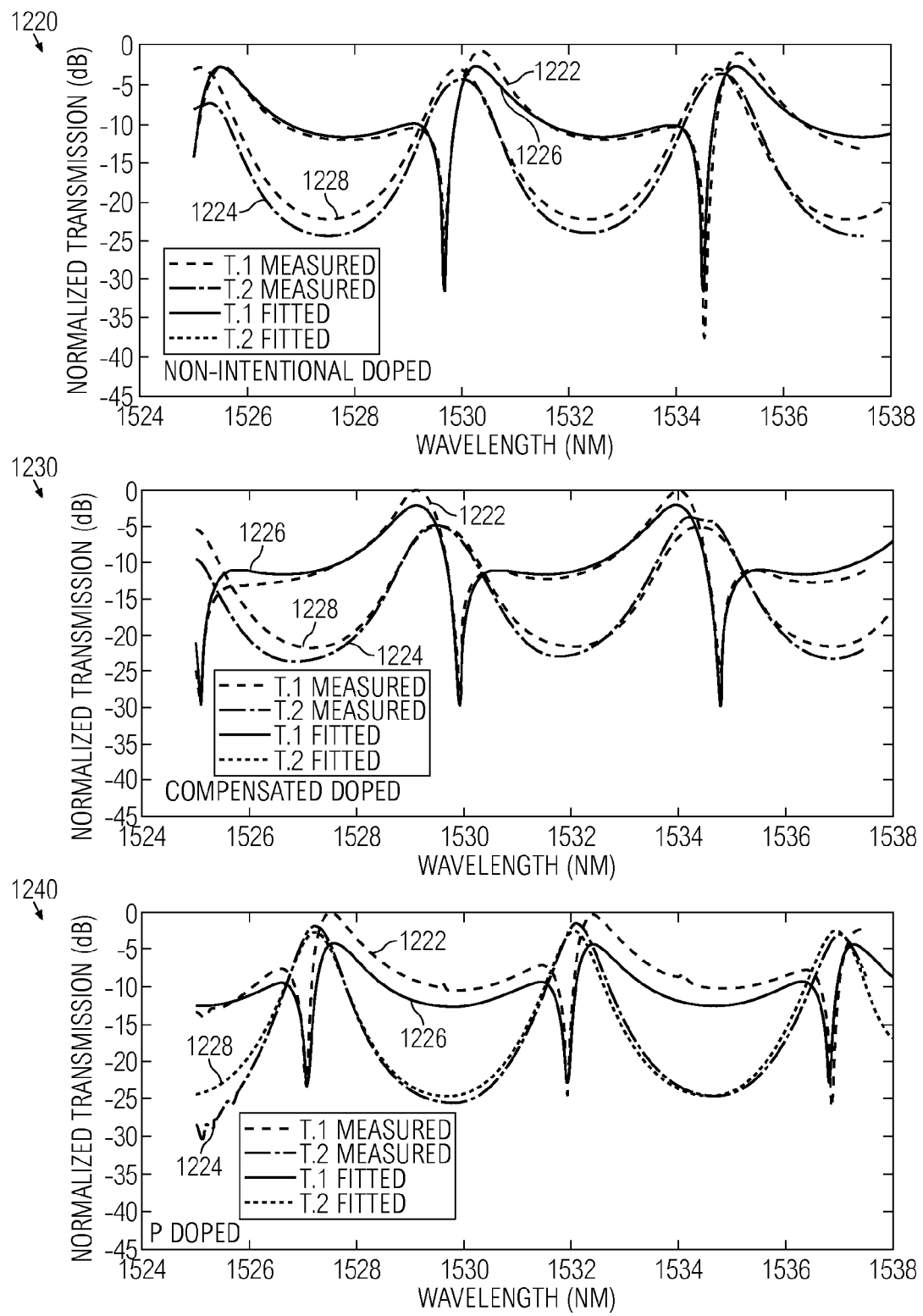
FIG. 12B shows plots of the measured and fitted transmission spectra for outputs T.1 and T.2 for different doping conditions, according to various embodiments.

FIG. 12B shows plots 1220, 1230, 1240, of the measured and fitted transmission spectra for outputs T.1 and T.2 for different doping conditions, according to various embodiments. The plot 1220 is for non-intentional doped (or original undoped SOI), the plot 1230 is for compensated doped and the plot 1240 is for p-type doped. In each of the plots 1220, 1230, 1240, the curve represented by 1222 shows the measured spectrum for output T.1, the curve represented by 1224 shows the measured spectrum for output T.2, the curve represented by 1226 shows the fitted spectrum for output T.1 and the curve represented by 1228 shows the fitted spectrum for output T.2.

The measured free spectra range (FSR) of ring a under non-intention doping condition is about 4.8 nm, corresponding to a group index, $N_g$, of about 3.86 with a resonance wavelength, $\lambda_{res}$, of about 1529.68 nm. The extinction ratio of the light output from T.2 reaches approximately 40 dB. In various embodiments, there is a shift between the resonance wavelengths of the two ring resonators, which may be due to the lithography and etching process during fabrication.

The spectra of T.1 and T.2 may be fitted with the parameters as shown in Table 3.

TABLE 3

The fitting parameters of outputs T.1 and T.2 of two cascaded micro-ring resonators.

| | Group index Ring a | Group index Ring b | Transmission coefficient, t | Roundtrip absorption, α | Bend loss (R = 20 μm) |
|---|---|---|---|---|---|
| Non-intentional doped | 3.86000 | 3.87095 | 0.750 | 0.976 (+/−0.001) | −1.93 dB/cm (+/−0.08) |
| R1 (compensated doped) | 3.85750 | 3.84715 | 0.755 | 0.962 (+/−0.001) | −3.08 dB/cm (+/−0.08) |
| R2 (p-type doped) | 3.85300 | 3.84010 | 0.780 | 0.947 (+/−0.001) | −4.33 dB/cm (+/−0.08) |

The doping profiles for R1 and R2 are that of the simulated profiles as shown in FIG. 10A.

The improvement of the measured bend loss for the resonator prepared with the compensated doping method is approximately 1.3 dB/cm, as compared to the p-type doped resonator. Except the roundtrip absorption loss, the improvement of absorption loss may also be seen from the group index, the transmission coefficient and the extinction ratio on the transmission spectra.

Based on free carriers injection effect and the Drude model [R. A. Soref, and B. R. Bennett, *IEEE J. Quantum Electronics*, QE-23, 123-129 (1987)], an absorption coefficient decrease of Δα induces a blue shift of the resonance wavelength and a corresponding decrease of the refractive index $\Delta n_{eff}$, which is related to $N_g$ by the relationship $N_g(\lambda) = n_{eff} + (dn_{eff}/d\lambda)\Delta\lambda$.

Following a decrease in the refractive index is an increase in the transmission coefficient, t, which fits well with the measured results as shown in Table 3. Looking at the extinction ratio on the transmission spectra of T.1, the compensated doped structure lies between the non-intentional doped and p-type doped structures, which also demonstrates the effect of the compensated doping method.

The measured results for the straight wavdguides and the resonators (bend waveguides) show that for a certain doping level, the absorption losses of both of the straight waveguide and the bend waveguide may be reduced compared with that of the fully doped conditions. The measured loss reduction results are compatible with the simulation results shown in Table 2.

In various embodiments, a 10 GHz silicon optical modulator was fabricated, with a coupling loss of about 3 dB (suspended coupler for two facets) and an absorption loss of about 1.4 dB (for 4 mm phase shift), thereby producing a total loss of about 4.4 dB.

While the invention has been particularly shown and described with reference to specific embodiments, it should be understood by those skilled in the art that various changes in form and detail may be made therein without departing from the spirit and scope of the invention as defined by the appended claims. The elements of the various embodiments may be incorporated into each of the other species to obtain the benefits of those elements in combination with such other species, and the various beneficial features may be employed in embodiments alone or in combination with each other. The scope of the invention is thus indicated by the appended claims and all changes which come within the meaning and range of equivalency of the claims are therefore intended to be embraced.

What is claimed is:

1. An optical modulator, comprising:
   a depletion region comprising a junction between a first conductivity type portion and a second conductivity type portion, the first conductivity type portion and the second conductivity type portion being in contact with each other;
   a first intrinsic region; and
   a second intrinsic region; and
   wherein the depletion region is disposed between the first intrinsic region and the second intrinsic region, and in contact with the first intrinsic region and the second intrinsic region,
   wherein the first intrinsic region is in contact with the first conductivity type portion,
   wherein the first intrinsic region comprises dopants of a first conductivity type and dopants of a second conductivity type, wherein a concentration of the dopants of the first conductivity type is higher than a concentration of the dopants of the second conductivity type,
   wherein the second intrinsic region is in contact with the second conductivity type portion,
   wherein the second intrinsic region comprises dopants of the first conductivity type and dopants of the second conductivity type, wherein a concentration of the dopants of the second conductivity type is higher than a concentration of the dopants of the first conductivity type, and
   wherein the first conductivity type and the second conductivity type are opposite conductivity types.

2. The optical modulator as claimed in claim 1, wherein the concentration of the dopants of the first conductivity type in the first intrinsic region is lower than a concentration of dopants provided in the first conductivity type portion of the junction.

3. The optical modulator as claimed in claim 1, wherein the concentration of the dopants of the second conductivity type in the second intrinsic region is lower than a concentration of dopants provided in the second conductivity type portion of the junction.

4. The optical modulator as claimed in claim 1, wherein the first conductivity type portion and the second conductivity type portion of the junction are configured to have different widths.

5. The optical modulator as claimed in claim 1, wherein the first conductivity type portion is configured to have a smaller width than a width of the second conductivity type portion.

6. The optical modulator as claimed in claim 1, further comprising:
   a first slab doped with dopants of the first conductivity type, wherein the first slab is coupled to the first conductivity type portion of the junction; and a second slab doped with dopants of the second conductivity type, wherein the second slab is coupled to the second conductivity type portion of the junction.

7. The optical modulator as claimed in claim 6, wherein the first slab comprises dopants at a concentration substantially equal or higher than a concentration of dopants in the first conductivity type portion of the junction.

8. The optical modulator as claimed in claim 6, wherein the second slab comprises dopants at a concentration substantially equal or higher than a concentration of dopants in the second conductivity type portion of the junction.

9. The optical modulator as claimed in claim 1, further comprising a substrate, wherein the depletion region is disposed on the substrate, and wherein the junction of the depletion region is arranged at least substantially perpendicular to the substrate.

10. The optical modulator as claimed in claim 1, further comprising a substrate, wherein the depletion region is disposed on the substrate, and wherein the junction of the depletion region is arranged at least substantially parallel to the substrate.

11. The optical modulator as claimed in claim 1, wherein the depletion region is configured to form an active region of the modulator for propagation of an optical mode.

12. The optical modulator as claimed in claim 11, further comprising a substrate, wherein the depletion region is disposed on the substrate, and wherein the junction of the depletion region is arranged at least substantially perpendicular to the substrate.

* * * * *